United States Patent
Xia et al.

(10) Patent No.: US 7,210,121 B2
(45) Date of Patent: Apr. 24, 2007

(54) METHOD AND SYSTEM FOR GENERATING FIRST CLASS CITIZEN APPLICATION IMPLEMENTING NATIVE SOFTWARE APPLICATION WRAPPER

(75) Inventors: Bing Xia, Fremont, CA (US); Singyun Brian Chu, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 718 days.

(21) Appl. No.: 10/457,926

(22) Filed: Jun. 9, 2003

(65) Prior Publication Data

US 2004/0158813 A1    Aug. 12, 2004

Related U.S. Application Data

(60) Provisional application No. 60/445,763, filed on Feb. 7, 2003.

(51) Int. Cl.
*G06F 9/44* (2006.01)
*G06F 9/45* (2006.01)

(52) U.S. Cl. .................. 717/106; 717/108; 717/118

(58) Field of Classification Search ........ 717/106–108, 717/114–118, 148, 166–173, 178
See application file for complete search history.

(56) References Cited

U.S. PATENT DOCUMENTS

| | | | | |
|---|---|---|---|---|
| 6,029,000 A | * | 2/2000 | Woolsey et al. | 717/147 |
| 6,066,181 A | * | 5/2000 | DeMaster | 717/148 |
| 6,131,187 A | * | 10/2000 | Chow et al. | 717/106 |
| 6,219,787 B1 | * | 4/2001 | Brewer | 713/167 |
| 6,295,638 B1 | * | 9/2001 | Brown et al. | 717/148 |
| 6,295,645 B1 | * | 9/2001 | Brewer | 717/178 |
| 6,308,315 B1 | * | 10/2001 | Dice et al. | 717/106 |
| 6,317,872 B1 | * | 11/2001 | Gee et al. | 717/152 |
| 6,324,688 B1 | * | 11/2001 | Brown et al. | 717/148 |
| 6,351,844 B1 | * | 2/2002 | Bala | 717/128 |

(Continued)

OTHER PUBLICATIONS

Chiueh et al, "Spout : A transparent proxy for safe execucation of java applets", IEEE, vol. 20, issue 7, pp. 1426-1433, 2002.*

(Continued)

*Primary Examiner*—Anil Khatri
(74) *Attorney, Agent, or Firm*—Martine Penilla & Gencarella, LLP

(57) ABSTRACT

A method for camouflaging a non-native application as a native application of a device is provided. The method includes generating a native code wrapper in a device dependent native code to handle a communication between a native operating system and the non-native application. The method further includes applying the native code wrapper to the non-native application generating a wrapped non-native application. The non-native application remains intact while in contact with the native code wrapper.

18 Claims, 15 Drawing Sheets

U.S. PATENT DOCUMENTS

| | | | |
|---|---|---|---|
| 6,438,744 B2 * | 8/2002 | Toutonghi et al. | 717/137 |
| 6,473,759 B1 * | 10/2002 | Herrendoerfer et al. | 707/10 |
| 6,567,974 B1 * | 5/2003 | Czajkowski | 717/151 |
| 6,643,842 B2 * | 11/2003 | Angel et al. | 717/130 |
| 6,789,254 B2 * | 9/2004 | Broussard | 717/147 |
| 6,795,965 B1 * | 9/2004 | Yadav | 717/168 |
| 6,938,247 B2 * | 8/2005 | Czajkowski | 717/151 |
| 6,986,129 B2 * | 1/2006 | Arbouzov et al. | 717/146 |
| 7,134,119 B2 * | 11/2006 | Nevill | 717/139 |
| 7,143,400 B2 * | 11/2006 | Lee et al. | 717/141 |

OTHER PUBLICATIONS

Stepanian et al, "inlining Java native cells at runtime", ACM VEE, pp. 121-131, 2005.*

Duclos et al, "Describing and using non funcational aspects in component based applications", ACM AOSD, pp. 65-75, 2002.*

Whitehead, "An architectural model for application integartion in open hypermedia environments", ACM Hypertext, pp. 1-12, 1997.*

* cited by examiner

METHOD AND SYSTEM FOR GENERATING
FIRST CLASS CITIZEN APPLICATION
IMPLEMENTING NATIVE SOFTWARE
APPLICATION WRAPPER

CROSS REFERENCE TO RELATED
APPLICATIONS

This application claims priority from U.S. Provisional Patent Application No. 60/445,763, filed on Feb. 7, 2003 and entitled "Modularization of Wireless Device Code Components and Custom Design Integration of Java and Non-Java Code Components" by Lee et al., which is incorporated herein by reference in its entirety.

BACKGROUND OF THE INVENTION

1. Field of the Invention

This invention relates generally to mobile devices, and more particularly, to systems and methods for generating first class citizen software applications from non-native applications installed on mobile devices.

2. Description of the Related Art

Today, embedded mobile devices are being used by consumers all around the world leading to an ever-increasing demand for providing additional services. For example, initially, embedded mobile device users only had access to closed system mobile devices. That is, the users could only implement native applications pre-installed on the embedded mobile devices.

As consumer demands have increased and new technologies have developed, consumers are now able to install, access, and use new applications in addition to the pre-installed native applications. While having access to new applications is advantages, certain drawbacks cannot be ignored. For instance, an exemplary limitation is that the new applications are executed on the servers. Accordingly, the mobile devices must be in continuous communication with the server while the new application is being installed or used by the user. Furthermore, new native applications as well previously installed native applications can be accessed by the users very easily. By way of example, a user can directly access any of the native applications to perform a variety of actions (e.g., query information, update, create short cut, remove, etc.).

In stark contrast, a user must perform several intermediate operations to be able to access any of the newly installed non-native applications. For instance, the user can only access a newly-installed non-native Java™ application by first executing a Java Application Manager ("JAM") resident on the mobile device operating system. This occurs because Java applications are defined in the JAM and cannot be accessed or viewed without first executing the JAM. At this point, a first screen is presented to the user showing each of the Java applications in the JAM. Only after the JAM has been executed and a first screen is displaying the Java applications that the user can proceed with selecting a Java application. Upon selecting a Java application, the user is allowed access to the Java application so as to choose any of the available actions displayed on a second screen.

The drawback associated with accessing non-native applications is a two-fold problem. First, to locate and execute the JAM, the mobile device user has to be savvy in operating mobile devices, know that the newly installed application is a Java application, and that the Java application can only be located and accessed after JAM has been executed. The user also has to know how to launch the JAM application. Second, accessing non-native applications takes an extended period of time, inconveniencing and wasting users time.

One way to avoid executing the JAM so as to access the available actions is to convert the Java byte code of the Java application into the device dependent native language. In this manner, the converted Java byte code can be accessed directly, allowing the Java application to be accessed as if the Java application is a native application. Unfortunately, however, as a result of the conversion, the cross-platform nature of the Java application is lost. As a consequence, the converted Java application can no longer be run on a different mobile device having a different environment.

In view of the foregoing, a need therefore exists in the art for a method and system capable of generating first class software applications from non-native software applications downloaded and installed on mobile devices.

SUMMARY OF THE INVENTION

Broadly speaking, the present invention fills this need by providing a method and a system for generating first class citizen computer software applications of non-native software applications installed on a device while maintaining the non-native software applications intact. In one embodiment, the non-native nature of a computer software application downloaded to the device is hidden by a native code wrapper generated by the device while the non-native application is remained substantially intact. As defined herein, a first class citizen application, from a user's perspective, is one that functionally operates as close as possible as does a native code application. As used herein, wrapping a non-native application will enable similar functionality that is commonly expected by the user of a native application, enabling the user to maintain a consistent functional interface to native applications as well as non-native applications wrapped as defined herein. Furthermore, as used herein, camouflaging a non-native application by wrapping the non-native application with the native code wrapper will enable similar functionality that is commonly expected by the user of a native application. It should be appreciated that the present invention can be implemented in numerous ways, including as a process, an apparatus, a system, a device, or a method. Several inventive embodiments of the present invention are described below.

In one embodiment, a method for camouflaging a non-native application as a native application of a device is provided. The method includes generating a native code wrapper in a device dependent native code to handle a communication between a native operating system and the non-native application. The method further includes applying the native code wrapper to the non-native application generating a wrapped non-native application. The non-native application remains intact while in contact with the native code wrapper.

In another embodiment, a method for generating a native code wrapper to hide a non-native nature of a Java application being downloaded to a device is provided. The method includes analyzing the Java application. The method further includes generating a device dependent native code to handle a communication between a native operating system and the Java application while keeping the Java application intact.

In still another embodiment, a method for accessing a native application and a non-native application identically is provided. The method includes downloading an application and detecting a type of the application. If the type of the application is native, the method further includes registering the application with a native operating system. If the type of the application is not native, the method continues to generate a native code wrapper for the application. Also included in the method is applying the native code wrapper to the application so as to generate a wrapped non-native application. Applying the native code wrapper to the application is configured to keep the application intact. The method also includes registering the wrapped non-native application with the operating system as a new native application. The native code wrapper camouflages the application having a non-native type as a native application.

In yet another embodiment, a computer program embodied on a computer readable medium for camouflaging a non-native application as a native application of a device is provided. The computer program includes program instructions for generating a native code wrapper in a device dependent native code to handle communication between a native operating system and the non-native application. The computer program also includes program instructions for applying the native code wrapper to the non-native application generating a wrapped non-native application. The non-native application remains intact while in communication with the native code wrapper.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
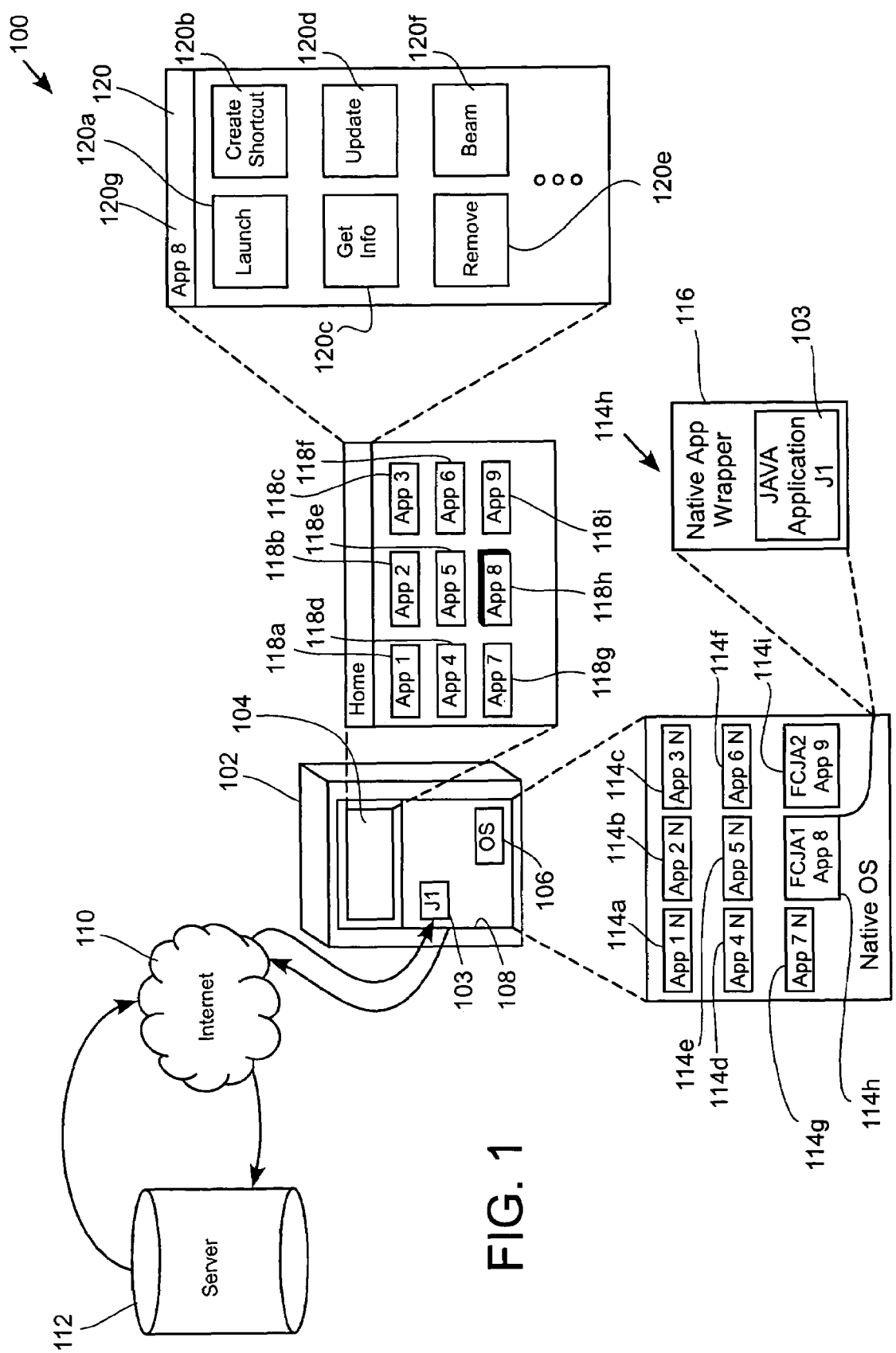
FIG. 1 depicts a simplified block diagram of a system illustrating the generation of a first class citizen application from a non-native Java application being downloaded to a mobile device, in accordance with one embodiment of the present invention.

Inventions for generating first class citizen computer software applications from non-native computer software applications installed on a device are provided. Several exemplary embodiments of the invention will now be described in detail with reference to the accompanying drawings.

The embodiments of the present invention provide methods and system for generating first class citizen applications from non-native applications installed on a mobile device. In one example, a non-native application is analyzed so that a native code wrapper can be generated. The native code wrapper is in the device dependent native code and is generated by the device. The non-native application is processed/transformed using the native code wrapper so as to create a corresponding first class citizen application. In one embodiment, the native code wrapper provides the functionalities of native applications. By way of example, the native code wrapper can be configured to handle API requests generated by the native operating system in the same manner generally handled by the native applications.

In one embodiment, the non-native application is a Java application. In this embodiment, the non-native Java application is analyzed by a Java application manager ("JAM") and a corresponding native code wrapper is generated. In another embodiment, the non-native application can be downloaded from a provisioning server or from a different device.

In one example, the provisioning server is a Java™ 2 Enterprise Edition (J2EE)™ server serving Java applications (MIDlets) specially designed for mobile devices. Of course, the server-device communication interface can take on many forms, and can be a product developed by any company, so long as the claimed functions can be executed thereon.

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

I. Environment Description

As embodiments of the present invention can implement the J2EE, J2ME, or Enterprise JavaBeans (EJB) application, a brief introduction to J2ME, J2EE, and EJB architectures are provided below. The Java 2, Micro Edition (J2ME) platform is a Java platform for consumer and embedded devices such as mobile phones, Personal Digital Assistants (PDAs), TV set-top boxes, in-vehicle telematics systems, and a broad range of embedded devices. Similar to the enterprise (J2EE), desktop (J2SE™) and smart card (Java Card™) counterparts, the J2ME platform is a set of standard Java application program interfaces (APIs) defined through the Java Community Process$^{SM}$ program by expert groups that include leading device manufacturers, software vendors and service providers.

The J2ME platform delivers the power and benefits of Java technology tailored for consumer and embedded devices. The J2ME provides a flexible user interface, robust security model, broad range of built-in network protocols, and support for networked and disconnected applications. J2ME applications are written for a wide range of devices. As such, the J2ME applications can be downloaded dynamically and leverage each native capability of each device. The J2ME platform can be deployed on millions of devices (e.g., mobile phones, PDAs, automotive devices, etc.) supported by leading Java technology tools vendors and used by companies worldwide. Briefly stated, J2ME is the preferable platform for consumer and embedded devices.

The SDK provides software programmers with the speed, security and functionality to create cross-platform, mission critical applications. The JRE provides the execution environment needed to run Java platform-based applets and applications.

The J2ME architecture defines configurations, profiles and optional packages as elements for building complete Java runtime environments that meet the requirements for a broad range of devices and target markets. Each combination is optimized for the memory, processing power, and I/O capabilities of a related category of devices. The result is a common Java platform that fully leverages each type of device to deliver a rich user experience.

Configurations

Configurations are composed of a virtual machine and a minimal set of class libraries. The configurations provide the base functionality for a particular range of devices that share similar characteristics (e.g., network connectivity, memory footprint, etc.). Currently, there are two J2ME configurations: the Connected Limited Device Configuration (CLDC), and the Connected Device Configuration (CDC):

CLDC

CLDC is the smaller of the two configurations, and by way of example, is designed for devices with intermittent network connections, slow processors, and limited memory (e.g., mobile phones, two-way pagers, PDAs, etc.). By way of example, the devices may have either 16- or 32-bit CPUs, and a minimum of 128 KB to 512 KB of memory available for the Java platform implementation and the associated applications.

CDC

CDC is designed for devices having more memory, faster processors, and greater network bandwidth (e.g., TV set-top boxes, residential gateways, in-vehicle telematics systems, high-end PDAs, etc.). CDC includes a full-featured Java virtual machine, and a much larger subset of the J2SE platform than CLDC. As a result, most CDC-targeted devices have 32-bit CPUs and a minimum of 2 MB of memory available for the Java platform and associated applications.

Profiles

In order to provide a complete runtime environment targeted at specific device categories, configurations can be combined with a set of higher level APIs or profiles that further define the application life cycle model, the user interface, and access to device specific properties.

Mobile Information Device Profile

The Mobile Information Device Profile (MIDP) is designed for mobile phones and entry-level PDAs. Broadly speaking, MIDP can be used on any computing device that needs to take advantage of MIDP's functions. MIDP is a set of Java APIs which, together with CLDC, provides a complete J2ME application runtime environment targeted at mobile information devices, such as mobile phones and entry level PDAs. In this manner, MIDP offers the core application functionality required by mobile applications (e.g., the user interface, network connectivity, local data storage, and application management, etc.). Combined with CLDC, MIDP provides a substantially complete Java runtime environment that leverages the capabilities of handheld devices and minimizes both memory and power consumption.

Currently, CLDC, combined with the MIDP is the Java runtime environment for mobile information devices (MIDs) (e.g., phones, entry level PDAs, etc.). MIDP provides the core application functionality required by mobile applications (e.g., the user interface, network connectivity, local data storage, and application life-cycle management packaged as a standardized Java runtime environment and set of Java APIs, etc.).

Foundation Profile

CDC profiles are layered so that profiles can be added as needed to provide application functionality for different types of devices. The Foundation Profile (FP) is the lowest level profile for CDC and provides a network-capable implementation of CDC that can be used for deeply embedded implementations without a user interface. FP can also be combined with Personal Basis Profile and Personal Profile for devices that require a graphical user interface (GUI).

Personal Profile

The Personal Profile (PP) is the CDC profile aimed at devices requiring full GUI or Internet applet support (e.g., high-end PDAs, communicator-type devices, game consoles, etc.). PP includes the full Java Abstract Window Toolkit (AWT) libraries and offers Web fidelity capable of easily running Web-based applets designed for use in a desktop environment. PP replaces PersonalJava™ technology and provides PersonalJava applications a clear migration path to the J2ME platform.

Personal Basis Profile

The Personal Basis Profile (PBP), is a subset of PP. PBP provides an application environment for network connected devices that support a basic level of graphical presentation or require the use of specialized graphical toolkits for specific applications. Devices (e.g., TV set-top boxes, in-vehicle telematics systems, information kiosks, etc.) Both PP and PBP are layered on top of CDC and FP.

Optional Packages

The J2ME platform can be further extended by combining various optional packages with CLDC, CDC, and their corresponding profiles. In this manner, specific market requirements can be addressed. Furthermore, optional packages can offer standard APIs for using both existing and emerging technologies (e.g., Bluetooth, Web services, wireless messaging, multimedia, database connectivity, etc.). As optional packages are modular, device manufacturers can include the optional packages, as needed, to fully leverage the features of each device.

By way of example, J2ME™ Mobile Media API Reference Implementation Version 1.0 (MMAPI) extends the functionality of the J2ME platform by providing audio, video and other time-based multimedia support to resource-constrained devices. MMAPI allows Java developers to gain access native multimedia services available on a given device.

The reference implementation for MMAPI runs on the CLDC/MIDP profile running on Windows 2000. By way of example, the reference implementation for MMAPI has support for simple tone generation, tone sequencing, audio/video file playback and streaming, interactive MIDI, and audio/video capture. The J2ME MMAPI reference implementation is a source code product provided for porting to various platforms. The MMAPI specification has been developed through the Java Community Process$^{SM}$ (i.e., JSR-135) by an expert group composed of companies representing device manufacturers, wireless operators and software vendors.

As the embodiments of the present invention can also involve using Enterprise Java Beans (EJB)™ in J2EE platform, below are brief descriptions to the J2EE platform and EJBs. The Java™ 2 Enterprise Edition (J2EE™), developed by Sun Microsystems, Inc., is the development and deployment environment for enterprise software applications capable of running on a variety of desktop computers, servers, and other computing devices. J2EE provides architecture for developing, deploying, and executing applications in a distributed-object environment. In one embodiment, the J2EE platform comprises the Java 2 Software Development Kit, Standard Edition (SDK), and Java Runtime Environment (JRE).

J2EE facilitates building Web-based applications. Broadly speaking, J2EE services are performed in the middle tier between the user browser and the databases and legacy information systems. J2EE comprises a specification, reference implementation and a set of testing suites. J2EE further comprises Enterprise JavaBeans (EJB), JavaServer Pages (JSP), Java servlets, and a plurality of interfaces for linking to information resources in the platform.

The J2EE specifications define how applications should be written for the J2EE environment. Thus the specifications provide the contract between the applications and the J2EE platform. However, there exist a class of JAVA applications that require customization of the J2EE platform. These applications generally utilize application specific strategies created by a particular vendor to accomplish specific tasks that are not provided by the general JAVA platform on which the application executes. Examples of this class of JAVA applications include telecommunications applications and services that are deployed within a particular service provider's environment. This class of applications typically requires continuous availability, which means the environment in which the applications operate requires the applications to be available most of the time.

Summarily, EJB architecture promotes the creation of re-usable server-side behaviors or instructions in the Java language, connectors to enable access to existing enterprise systems, and easy-to-deploy program modules. The EJB architecture creates a collaborative architecture to provide services virtually anywhere, and for a wide range of customers and devices, including mobile devices.

The EJB architecture defines a model for the development and deployment of reusable Java server components called EJB components (i.e., EJB beans). As designed, the EJB component is a non-visible server component having methods that provide business logic in a distributed application. In one example, the EJB architecture includes the EJB client and the EJB server. The EJB client is configured to provide the user-interface logic on a client machine and to make calls to remote EJB components on a server. For instance, the EJB client is provided the information as to how to find the EJB server and how to interact with the EJB components.

In one example, the EJB client does not communicate directly with the EJB component. In one aspect, the EJB container provides the client proxy objects that implement the home and remote interfaces of the component. In another instance, the remote interface is configured to define the business methods that can be called by the client. In another embodiment, the client is configured to invoke the methods resulting in the updating of the database. Thus, the EJB beans are reusable components that can be accessed by client programs. The application programmer codes the business logic into the EJBs and deploys them into a J2EE compliant server. In one example, the server complying with the J2EE specification provides the required system-level services, thus allowing the application programmer to concentrate on business logic.

The EJB server (i.e., the EJB application) includes an EJB container, which in one example provides the services required by the EJB component. For instance, the EJB container may be configured to include one of an EJB home interface or EJB Remote interface and EJB beans. In one embodiment, the EJB home interface and the EJB remote interface are defined in the same Java virtual machine. In a different embodiment, the EJB home interface and the EJB remote interface may be defined on different Java virtual machines or separate physical computers.

In one example, the EJB specification defines a container as the environment in which one or more EJB components can be executed. In accordance to one example, the EJB container provides the infrastructure required to run distributed components thus allowing the clients and component developers to focus on programming business logic. Simply stated, the container manages the low-level communications between the clients and the EJB beans. In one example, once an EJB bean is created by a client, the client invokes methods on the EJB bean as if the EJB bean were running in the same virtual machine as the client.

Furthermore, the clients are unaware of activities on the EJB bean, since the container is configured to sit between the clients and the EJB beans. For instance, if an EJB bean is passivated, its remote reference on the client remains intact. Thus, when the client later invokes a method on the remote reference, the container activates the EJB bean to service the request.

The EJB container encapsulates:
The client runtime and generated sub classes. In one example, this allows the client to execute components on a remote server as if the components were local objects.
The naming service allows the clients to instantiate components by name. It further allows components to obtain resources (e.g., database connections, etc.) by name.
The EJB server component dispatcher, which in one example, executes the component's implementation class and provides services such as transaction management, database connection pooling, and instance lifecycle management.

In one example, three types of EJB components can be enumerated.
Stateful session Beans: A stateful session bean manages complex processes or tasks that require the accumulation of data. They further manage tasks that require more than one method call to complete but are relatively short lived, store session state information in class instance data, and have an affinity between each instance and one client from the time the client creates the instance until it is destroyed by the client or by the server.
Stateless session Beans: A stateless session bean manages tasks that do not require the keeping of client session data between method calls. Furthermore, the method invocation by a stateless session bean does not depend on data stored by previous method invocations, there is no affinity between a component instance and a particular client, and different instances of the stateless session beans are seemed identical to the client.
Entity Beans: An entity bean model is a business model that is a real-world object which methods are run on the server machine. When the entity bean method is called, the program's thread stops executing and control is passed to the server. When the method returns from the server, the local thread resumes executing. In one example, the entity beans have the following characteristics: Each instance represents a row in a persistent database relation (e.g., a table, view, etc.); and The bean has a primary key that corresponds to the database relation's key which is represented by a Java data type or class.

Each EJB component further has a transaction attribute configured to determine the manner the instances of the component participate in transactions. As designed, the EJB container provides services which can include transaction and persistence support to the EJB components. As to the transaction support, the EJB container is configured to support transactions. In one example, when the bean is deployed, the EJB container provides the necessary transaction support. In regard to the persistence support, the EJB container is configured to provide support for persistence of the EJB components, which in one embodiment, is defined as the capability of the EJB component to save and retrieve its state. In this manner, the EJB component does not have to be re-created with each use.

In one example, the EJB architecture is a three-tiered architecture in which the clients reside on the first tier, the application server and the components (i.e., EJB beans) reside on the second tier, and the databases reside on the same host as the EJB server. In accordance to one implementation, the EJB server executes methods on a component from the client or another component, retrieves data from databases, and performs other communications. The EJB server further handles the details of transactions, threads, security, database connections, and network communication. Summarily, the EJB clients request business-logic services from EJB beans running on the second-tier. The EJB beans then use the system services provided by the second-tier server to access data from existing systems in the third tier. The EJB beans apply the business rules to the data, and return the results to the clients in the first-tier.

In one example, the client contains the user interface. The business logic is configured to be separate from both the clients and the databases and resides in the same tier (i.e., second tier) as components that analyze data, perform computations, or retrieve information from data sources and processes.

As J2ME, J2EE, and EJBs use the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and Intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted)

into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

II. Creating First Class Citizen Software Applications from Non-native Software Applications Using Native Software Application Wrapper Keeping the overviews to J2EE, J2ME, EJBs, and Java in mind, reference is made to FIG. 1 depicting a simplified block diagram of a system 100 illustrating the generation of a first class citizen application from a non-native Java application being downloaded to a mobile device 102, in accordance with one embodiment of the present invention. The system 100 includes a Java application provisioning server 112 in communication with the mobile device 102 via Internet 110. In one example, the provisioning server 112 may include an application repository (e.g., a database). In another instance, the provisioning server 112 may be a provisioning server designed to serve J2ME applications, thus including a plurality of MIDlets stored to the application repository.

The embedded mobile device 102 has a screen 104 (i.e., display) and a storage 108 that stores an operating system 106. As shown, the user of the mobile device 102 has downloaded a Java application 103 from the provisioning server 112 to storage 108. Of course, the application can be of any non-native type and can be obtained from any source and in any data acquisition manner.

The native operating system 106 is shown to include a plurality of applications 114a–114i, with applications 114a–114g being native applications, and applications 114h and 114i being first class citizen applications. As defined herein, a first class citizen application, from a user's perspective, is one that functionally operates as close as possible or the same as does a native code application. To the user, therefore, a non-native application wrapped as defined herein, will enable similar functionality that is commonly expected by the user of a native application. Thus, a non-native application wrapped as defined herein, should enable the user to maintain a consistent functional interface, so that key assignments, shortcuts, use and feel navigation, and performance remains substantially the same for native applications as well as non-native applications wrapped as defined herein. As such, a user need not learn nor navigate through specialized (i.e., non-native directed) steps to activate or use a functional aspect of the application. If, for example, the non-native application does not facilitate a particular aspect that is commonly used or processed in a native code application (herein also referred to as native application), then the wrapper code will handle that aspect. Furthermore, as used herein, camouflaging a non-native application by wrapping the non-native application with the native code wrapper will enable similar functionality that is commonly expected by the user of a native application. Additional detail regarding the functional assistance provided by the wrapper code to enable non-native applications to interact as does a native application is provided below.

As further illustrated, the first class citizen application 114h includes a native code wrapper 116 that hides the Java application 1 103. In the same manner, a first class citizen application 2 114i includes a respective native code wrapper hiding a Java application 2 (not shown in this Figure).

As illustrated, the plurality of native applications 114a–114g and first class citizen applications 114h and 114i are all defined in the operating system 106, in the same manner. That is, unlike the prior art wherein the Java applications were hidden in the Java Application Manger (JAM), in accordance with one embodiment of the present invention, the Java applications of the present invention are not defined in the JAM. Rather, the nature of the Java applications 114h and 114i is hidden from the operating system 106 and thus the user by wrapping the Java applications 114h and 114i with a respective native code wrapper. It must be noted that the original Java applications are thus kept intact. As a consequence, the operating system 106 assumes and interacts with each of the applications 114a–114i as is done when interacting with a native application. As a result, in accordance with the embodiments of the present invention, the user does not need to execute the JAM to select and access any of the applications 114a–114i. As can be appreciated, contrary to the prior art, in one embodiment of the present invention, the JAM is hidden from the users.

Having discussed the contents of the operating system 106, partially, reference is made to a first display, home screen 118, displayed on the monitor 104. As illustrated, the home screen 118 displays a plurality of buttons 118a–118i, each corresponding to a respective application 114a–114i stored to the operating system 106. The displayed buttons 118a–118i are shown to be visually identical. That is, from a point of view of a user, each of the applications 114a–114i, as represented by a respective button 118a–118i, can be accessed in the same manner as if all of the applications are first class citizen applications. In the embodiment shown in FIG. 1, the user wishes to access the first class citizen application 114h, as the user has highlighted and selected the button 118h.

Upon entering the selection, a display screen 120 is displayed to the user depicting a plurality of buttons 120a–120f, each corresponding to an action that can be performed by the first class citizen application 114h. For instance, in the embodiment shown in FIG. 1, the user can access the first class citizen application 114h so as to launch, get information, remove, update, beam, or create a short cut to the application. Of course, one of ordinary skill in the art must appreciate that the user can perform each and every action performed on the native applications on the first class citizen applications.

As can be appreciated, in accordance with one embodiment of the present invention, the non-native Java application camouflaged by the first class citizen application can be accessed by the user as if the camouflaged non-native Java application is a native application. In this manner, any user, whether savvy or not in interacting with computers, can access each of the applications without having to execute the JAM, or waste an extended period of time waiting for the conversion of the non-native applications into the device dependent native language. Thus, one embodiment of the present invention bridges a gap existing between non-native applications and the underlying native operating system by wrapping the non-native application with the native code wrapper thus hiding the non-native nature of the non-native applications. As such, the native code wrapper enables the non-native Java application to be in compliant with the operating system expectations of a native application.

It must be noted by one of ordinary skill in the art that the Java application provisioning server can be a non-traditional manner of providing a new content into a device. Furthermore, it must be appreciated that the Java application provisioning server could be any type of a computer system so long as computer software applications can be downloaded therefrom (e.g., server, local computer, mobile device, etc.). Furthermore, there does not exist the necessity to obtain the non-native applications from a dedicated provisioning server.

It must be noted that the device 102 can be any type of embedded mobile device, a PDA, a mobile phone, etc. Furthermore, one must appreciated that generally speaking, the server and the embedded mobile device can communicate using any appropriate communication format (e.g., HyperText Transfer Protocol (HTTP), Linear Network Analysis Package (LNAP), Linear Wireless Application Protocol (LWAP), etc.). Additionally, the communication link between the Internet and the device or the server can be any appropriate communication link (e.g., Open and modular development environment (EDMA) network, global systems for Mobile Communications (GSM) network, cable connection, etc.). Additionally, the device and the server can be configured to implement Java programming language. Furthermore, the MIDlets or applications can be downloaded to any appropriate device data storage (e.g., memory, random access memory (RAM), flash memory, hot disc, mini hot disc, etc.).

Figure 2:
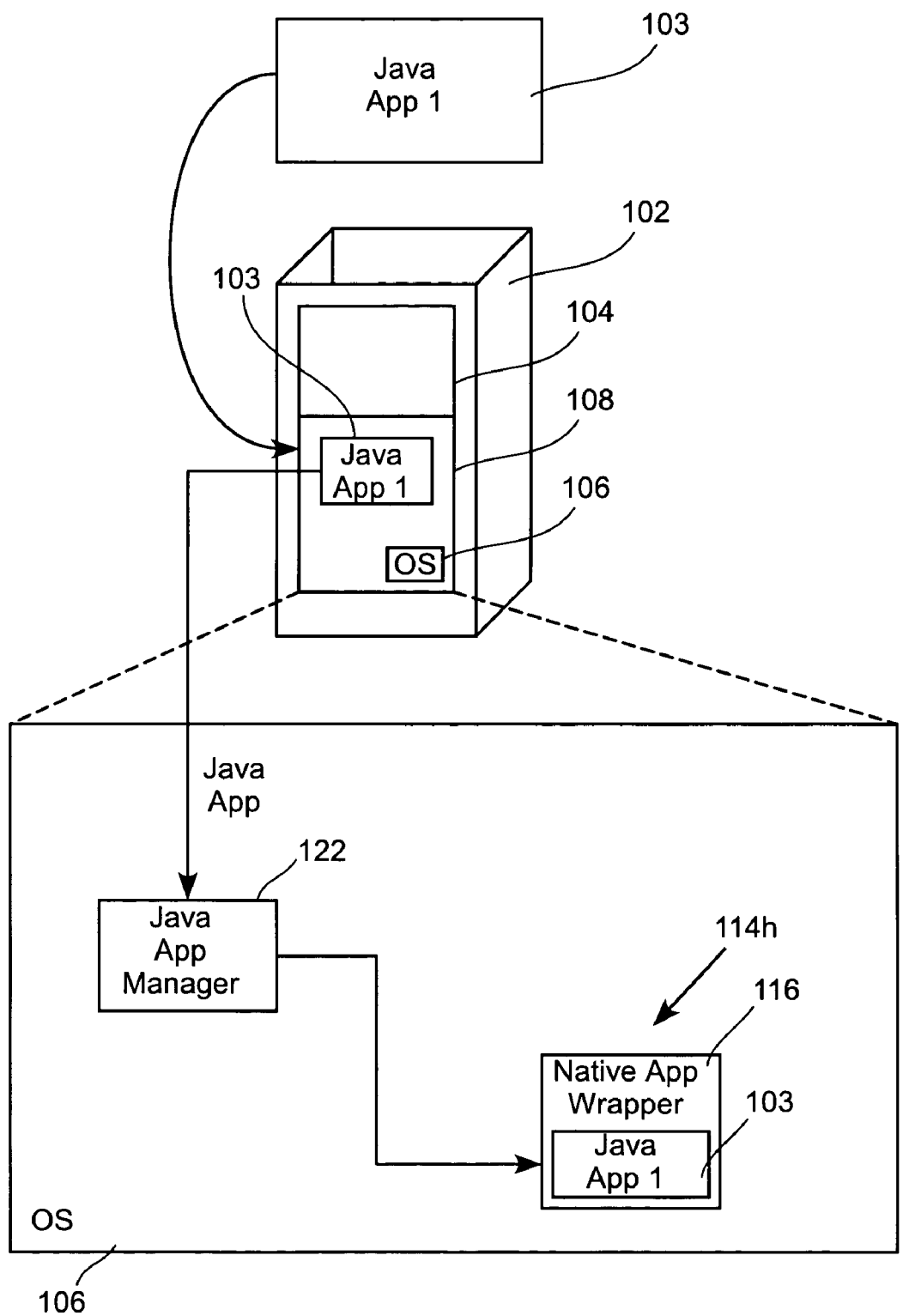
FIG. 2 shows a simplified block diagram illustrating the processing of the Java application and generation of the first class Java application shown in FIG. 1, in accordance with one embodiment of the present invention.

Reference is made to a simplified block diagram of FIG. 2 illustrating the processing of the Java application 103 and generation of the first class citizen application 114*h*, in accordance with one embodiment of the present invention. As shown, the Java application 103 is downloaded to the device 102. As part of installation, in one example, the Java application 103 is run through a JAM 122 configured to analyze the Java application so as to generate a corresponding native code wrapper 116. The native code wrapper 116 is generated in the native code of the device 102 and is configured to wrap around the Java application 103. As can be seen, the first class Java application 114*h* stands for the Java application 103 as camouflaged by being wrapped by the native code wrapper 116.

According to one embodiment of the present invention, a high level structure of a native code wrapper can include the native code, byte code/classes, static resource/info, and dynamic runtime resource/configuration. An exemplary high level structure of an exemplary native wrapper is shown below in Table 1.

TABLE 1

Native Wrapper High Level Structure

Native Code
Byte Code/Classes
Static Resource/Info
Dynamic Runtime Resource/Configuration In one example, the native code level includes functions necessary to carry out actions such as install, launch, remove, update, create shortcut, report version, upgrade, etc. The byte code/classes level includes all the necessary Java classes/byte code, etc. In one embodiment, the static resources level includes the application version, name, vendor, images, and icons. The static resources may not be modified during the lifetime of the application. The dynamic runtime resource/configuration level is a structure for the native code wrapper to retain the native code wrapper configurations (e.g., default font, number of colors, window size, etc.). The dynamic runtime resource/configuration may further include new data generated during the installation step (e.g., check sum, etc.).

For instance, in one example, if the user or the native operating system inquires as to whether the Java MIDlet is set to use a double buffer, a query can be made to the structure shown below in Table 3.

TABLE 3

Exemplary Structure

```
struct MIDprefsStruct {
    /* 0 */ Byte doubleBuffer;
    /* 1 */ Byte graphicsDepth;
    /* 2 */ Byte keypadKind;
    /* 3 */ Byte keypadPlace;
    /* 4 */ Byte hideSoftBtns;
};
struct KVMprefsStruct {
    /* 0 */ Long heapSize;
    /* 1 */ Long displayLines;
    /* 2 */ Byte licenseAccepted;
    /* 3 */ Byte saveOutput;
    /* 4 */ Byte showHeapStats;
    /* 5 */ Byte enableDebugger;
    /* 6 */ Short debuggerPort;
    /* 7 */ Byte advancedMode;
    /* 8 */ Byte doubleBuffer;
    /* 9 */ Byte graphicsDepth;
    /*10 */ Byte networking;
    /*11 */ Byte useHttpProxy;
    /*12 */ FontID editFont;
    /*13 */ Byte cacheVerifiedClass;
    /*14 */ Byte disableFindDialog;
    /*15 */ Byte disablePrefDialog;
};
```

One must appreciate that although the structure is shown to be multi-leveled, in a different embodiment, the structure of the native wrapper may be different. For instance, a pointer can be implemented from the native code level to any of the other files in the operating system. Thus, the native wrapper structure may not have to include a single file. Thus, there does not exist the necessity to store all the data in a single file. In another embodiment, the data may be stored to and implemented in a plurality of files. Nonetheless, from the user point of view, only one application can exist and as such, the user may not realize that the single application includes a plurality of files.

Table 2 below includes another exemplary structure for a native code wrapper.

TABLE 2

Exemplary Native code wrapper Structure

```
struct Wrapper {
    // Pointer to functions of pointers
    void* nativeCodePointer;
    int nativeCode_offset;
    // Bytecode
    void* bytecode;
    int bytecode_offset;
    // In one example, the variables will be set during
    // the installation and may not be
    // changed during the life time of
    // the application.
    char* application_name;
    char* application_version;
    char* application_install_date;
    long check_sum;
    // In one embodiment, the wrapper structure can be an array of resource
    for OS
    // e.g. user preference (double buffer)
```

TABLE 2-continued

Exemplary Native code wrapper Structure

```
// setting, heap-size allowance, debug
// flag)
// In one example, runtime-resume points to an array of resources.
// The resources can be determined during the installation time.
// In one example, MIDprefsStruct and KVMprefsStruct can be included
    char** runtime_resource;
    int number_of_runtime_resource;
};
```

In another implementation, the Java Archive ("JAR") and Java Application Descriptor ("JAD") files of a MIDlet may remain intact instead of being divided into different pieces. In one embodiment, the JAR file contains the class files of the application or MIDlet as well as all extra auxiliary resources associated with the application or MDlet. The JAD file, however, can include the text description of the application or MIDlet.

In still another embodiment, the byte code and resources of the native code wrapper can be encrypted. In such situation, a user having the correct authentication can make the native code wrapper execute the non-native applications.

Figure 3A:
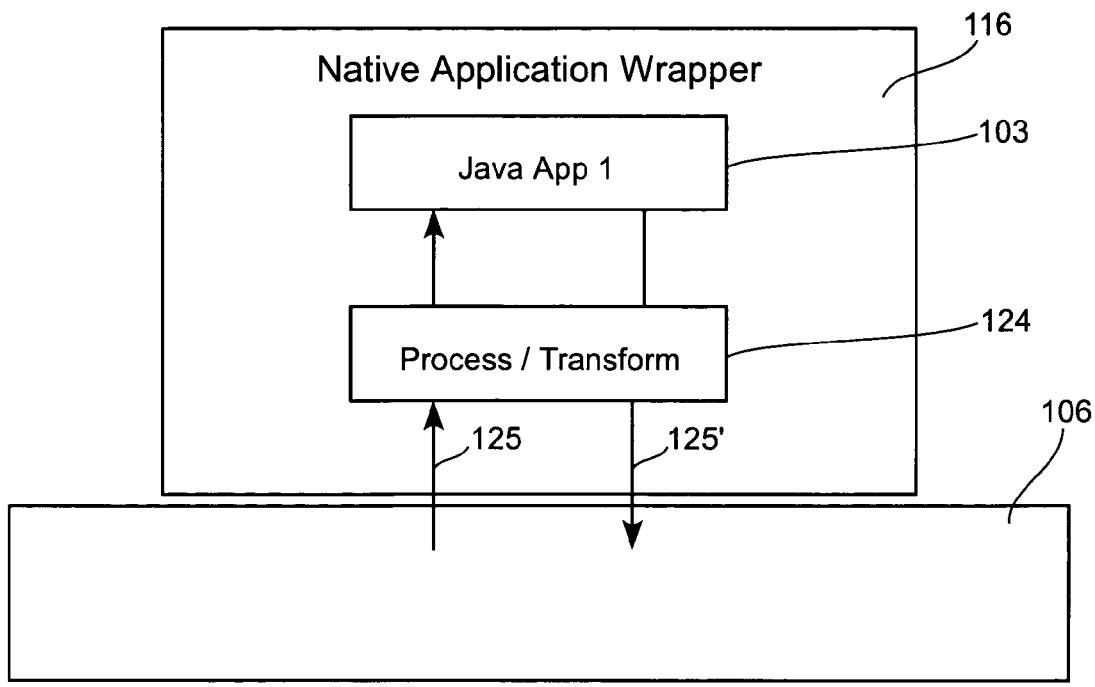
FIG. 3A depicts a simplified block diagram showing the handling and translating of certain application program interface ("API") calls generated by the native operating system, in accordance with another embodiment of the invention.
Figure 3B:
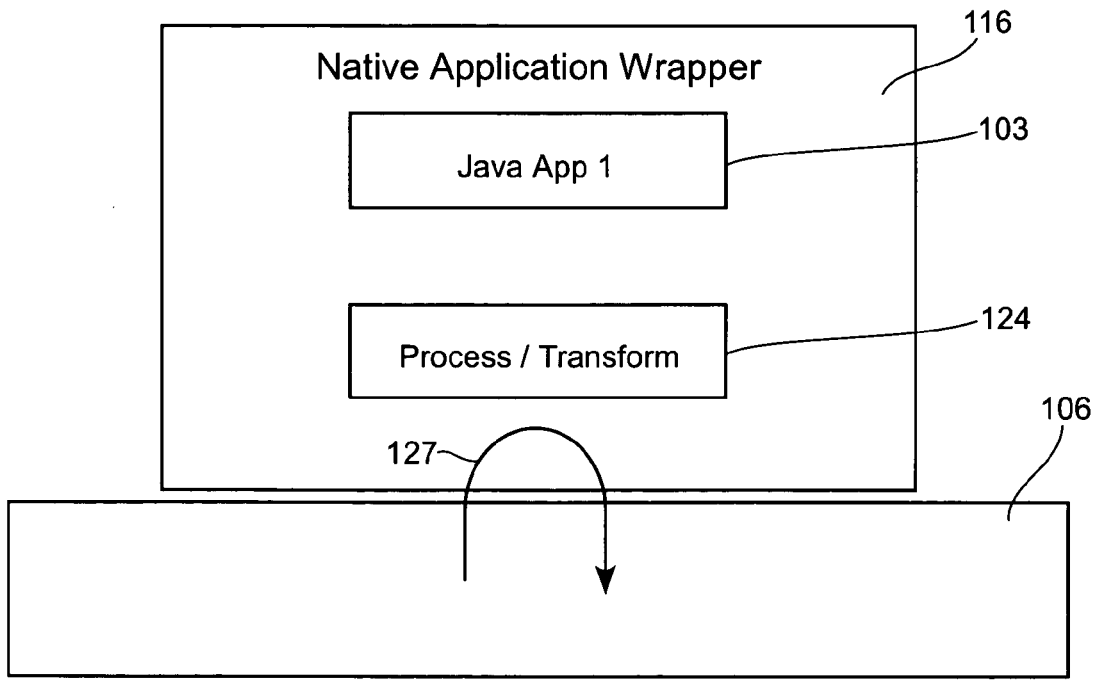
FIG. 3B depicts the native code wrapper handling a native API request issued by the native operating system using the process/transform layer, in accordance with another embodiment of the invention.

Proceeding to FIGS. 3A and 3B, certain functions of the native code wrapper 116 are illustrated, in accordance with one embodiment of the present invention. FIG. 3A is a simplified block diagram showing the handling and translating of certain application program interface ("API") calls generated by the native operating system 106, in accordance with one embodiment of the present invention. As can be appreciated, the non-native application (e.g., the Java application) may have been created by a third party who may not know of the device native environment or the device native API.

Acting as a process/transform layer 124, the native code wrapper 116 handles the API calls generated by the native operating system 106 in the same manner as a native application would handle the API call. In one example, in the embodiment shown in FIG. 3A, acting as the process/transform layer 124, the native code wrapper translates the native API request to a corresponding Java API request and forwards the Java API request to the Java application 1 103. Thereafter, upon generation of an API response by the Java application 1 103, again acting as a process/transform layer 124, the native code wrapper translates the API response to the corresponding native API and forwards the response in the native API to the underlying operating system 106.

For instance, in one embodiment, the native operating system 106 may inquire as to the size of the Java application 1 103 so as to determine whether enough space is available to install the non-native application.

In a different embodiment, rather than translating the API request, the native code wrapper may need to modify the format of the API request or the interface structure of the non-native application to Java format and interface structure and vice versa. In such example, the native code wrapper 116 can modify the format and interface structures, as required, without translating the API requests.

In still another embodiment, as illustrated in FIG. 3B, a native API request issued by the native operating system 106 can be handled by the native code wrapper 116 using the process/transform layer 124. However, the Java application 1 103 may not have the capability to provide a respond to such an API request. In such embodiment, as represented by the U-shaped arrow 127, the native code wrapper 116 handles the native API request, alone, and provides a corresponding API response to the native operating system 106 in the native API format. For instance, the API request for information created during the installation time (e.g., installation data, performance set during installation, security set up during installation, etc.) cannot be handled by the Java application 1 103. Thus, this API call is handled by the native code wrapper alone (e.g., systemGetInstallData( ) and SystemGetAppCertification ( ), etc.). Thus, native code wrapper of the present invention can be implemented to bridge the gap existing between the non-native application created by the third party and the device operating system.

Figure 4:
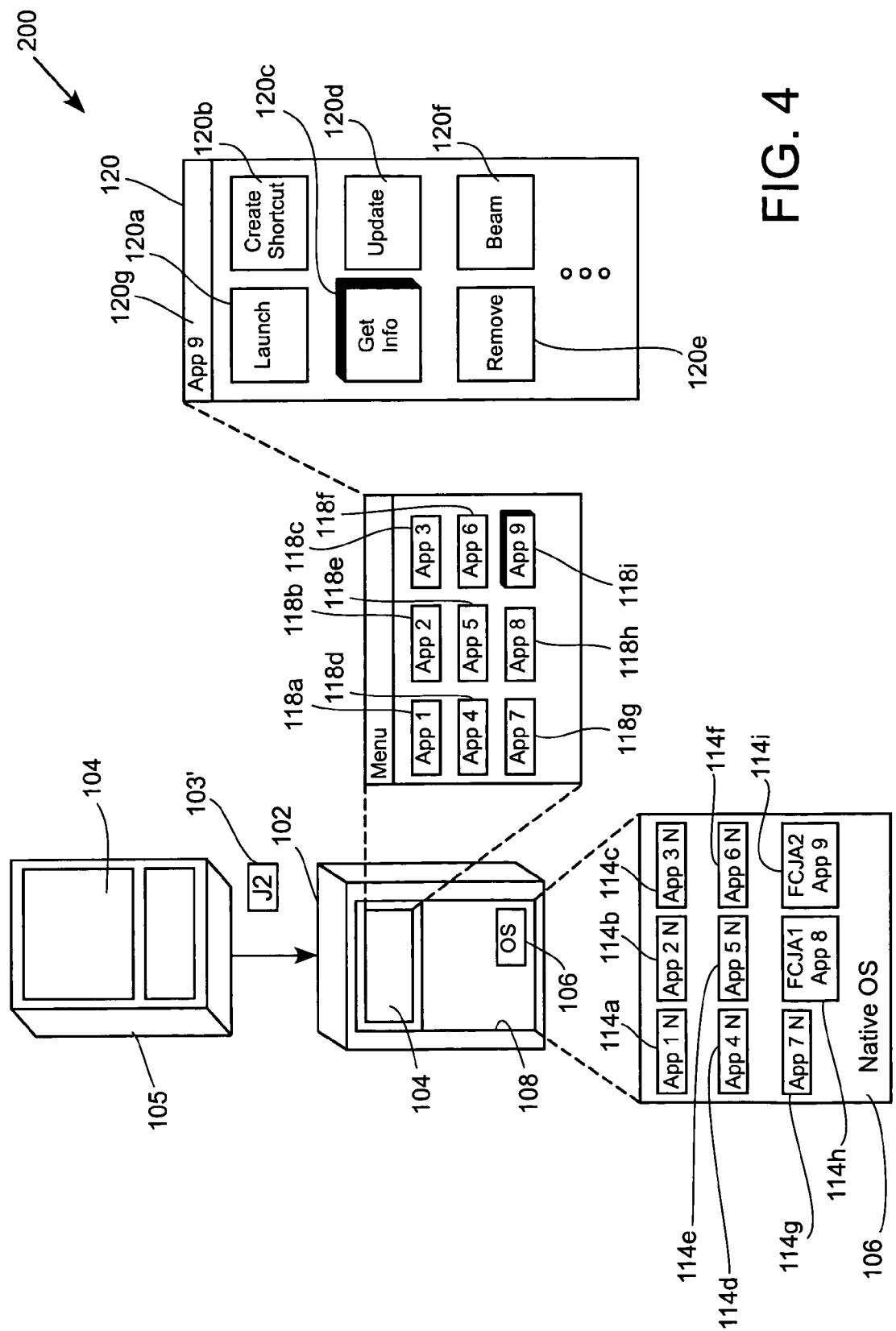
FIG. 4 depicts a simple block diagram illustrating the native code wrapper hiding a nature of a non-native application installed on the device via beaming, in accordance with yet another embodiment of the invention.

In one embodiment, the native code wrapper of the present invention can be used to hide a non-native nature of a non-native application installed on the device 102 via beaming a shown in FIG. 4, in accordance with one embodiment of the present invention. As shown, a Java application 2 103' is downloaded from a device 105 onto the device 102 by beaming. As can be seen, the Java application 2 103' is stored to the native operating system 106 as the first class citizen application 114i. In this manner, as camouflaged, the Java application 2 103' can be accessed via the native code wrapper as if the Java application 2 103' is a native application.

As further shown, the user has selected to access the application 9 118i, as displayed on the home screen 118. One of the ordinary skilled in the art should appreciate that in contrast to the prior art, the user need not run the JAM. In accordance with one embodiment of the present invention, the nature of the downloaded Java application 2 and the first class citizen application 114i, is hidden from the user. In this manner, the user can directly select the application 9 118i without having to waste time on converting the Java application into the native language. As illustrated, the user has highlighted the get info button 120c, attempting to obtain information about application 9 118i, as if the application 9 118i is one of the native applications.

Figure 5A:
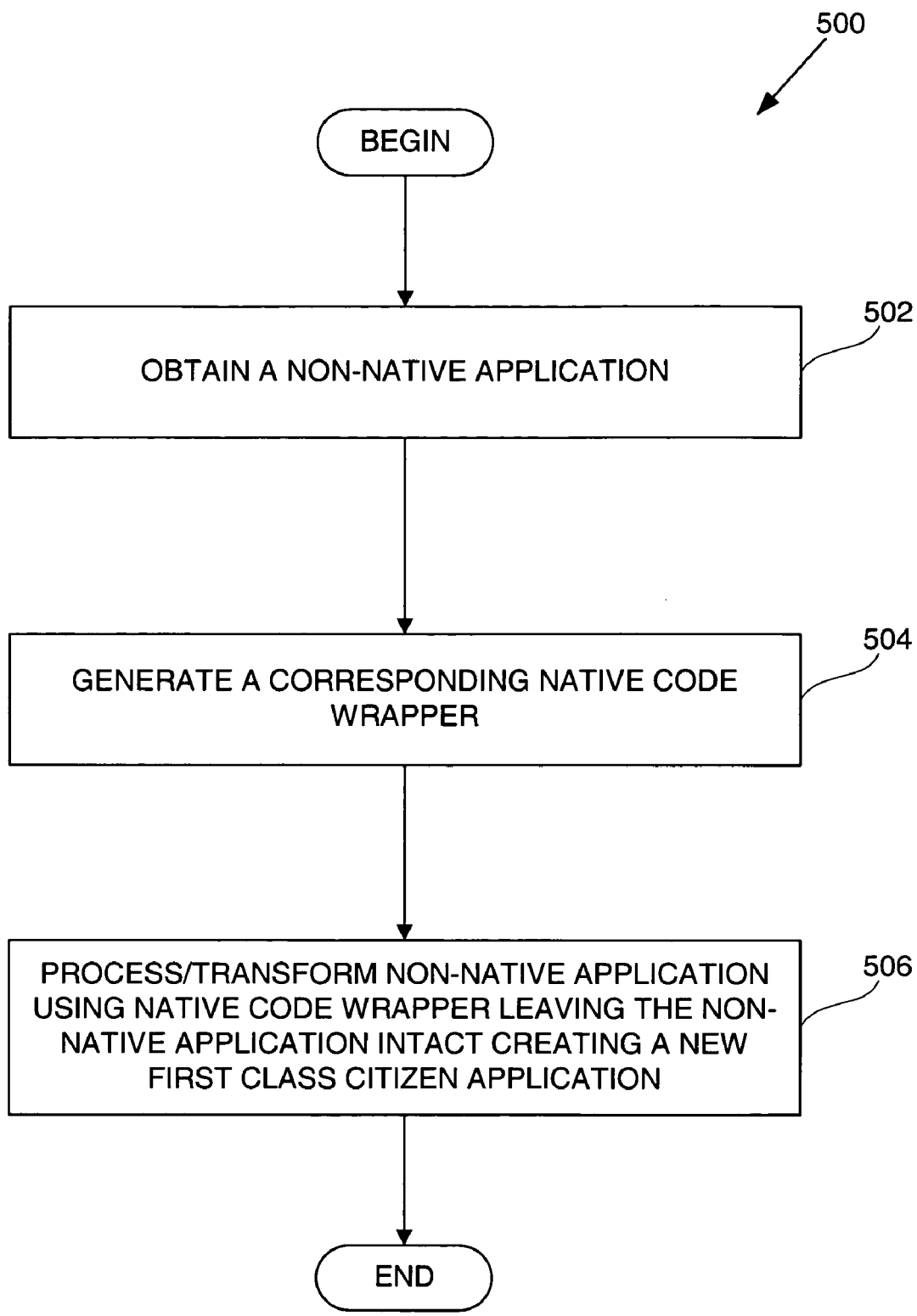
FIG. 5A shows a flowchart of method operations performed during generation of a first class citizen application from a downloaded non-native application, in accordance with still another embodiment of the invention.

FIG. 5A shows a flowchart 500 of method operations performed during generation of a first class citizen application from a downloaded non-native application, in accordance with one embodiment of the present invention. The method begins with operation 502 in which a non-native application is obtained. In one embodiment, the non-native application is a Java application and can be downloaded from a provisioning server or from a different device. Proceeding to operation 504, a corresponding native code wrapper is generated for the non-native application. The native code wrapper is in the device dependent native code and is generated by the device. Next, in operation 506, the non-native application is processed/transformed using the native code wrapper so as to create a corresponding first class citizen application. In one embodiment, the native code wrapper hides the nature of the non-native application, so that first class citizen application can comply with requirements imposed by the operating system on the native applications. In one implementation, the native code wrapper handles API requests generated by the native operating system effortlessly.

Figure 5B:
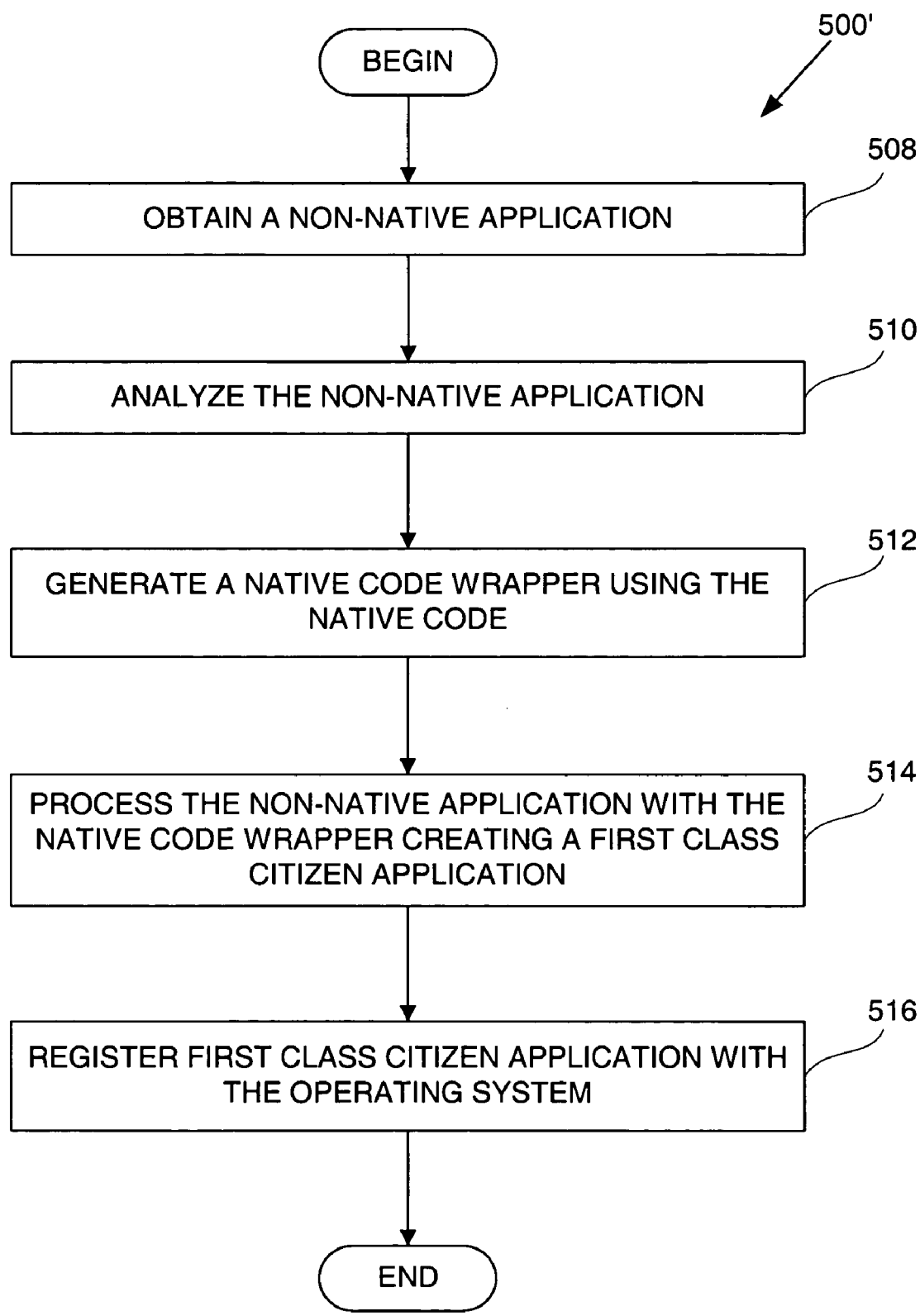
FIG. 5B is a more detailed flow chart diagram of method operations performed to generate a first class citizen application from a non-native application, in accordance with still another embodiment of the invention.

FIG. 5B is a more detailed flow chart diagram 500' of method operations performed to generate a first class citizen application from a non-native application, in accordance with one embodiment of the present invention. The method begins in operation 508 in which a non-native application is obtained. In one example, the non-native application is a Java application and the non-native application can be downloaded from a Java application provisioning server or from a different mobile device via beaming. Proceeding to operation 510, the non-native application is analyzed. For instance, when the non-native application is a Java application, the non-native application is analyzed by the resident Java Application manager (JAM). Then, in operation 512, a native code wrapper is generated using the native code. The native code wrapper is a native application generated for each non-native application on the device so as to provide the same functionalities provided by native applications.

Continuing to operation 514, the non-native application is camouflaged by being wrapped by the native code wrapper. In this manner, a first class citizen application is created while the non-native nature of the non-native application is hidden and the non-native application is remained intact. Next, in operation 516, the first class citizen application is registered with the operating system as if a first class citizen application. As a result, the non-native nature of the application is hidden from the user allowing the user to access the first class citizen application and any of the native applications analogously. As will be explained in more detail below with respect to FIGS. 8A–8E, the functionality of the native code wrapper is to provide the functionality provided by native applications by handling native API requests generated by the operating system generally handled by the native applications.

Figure 6:
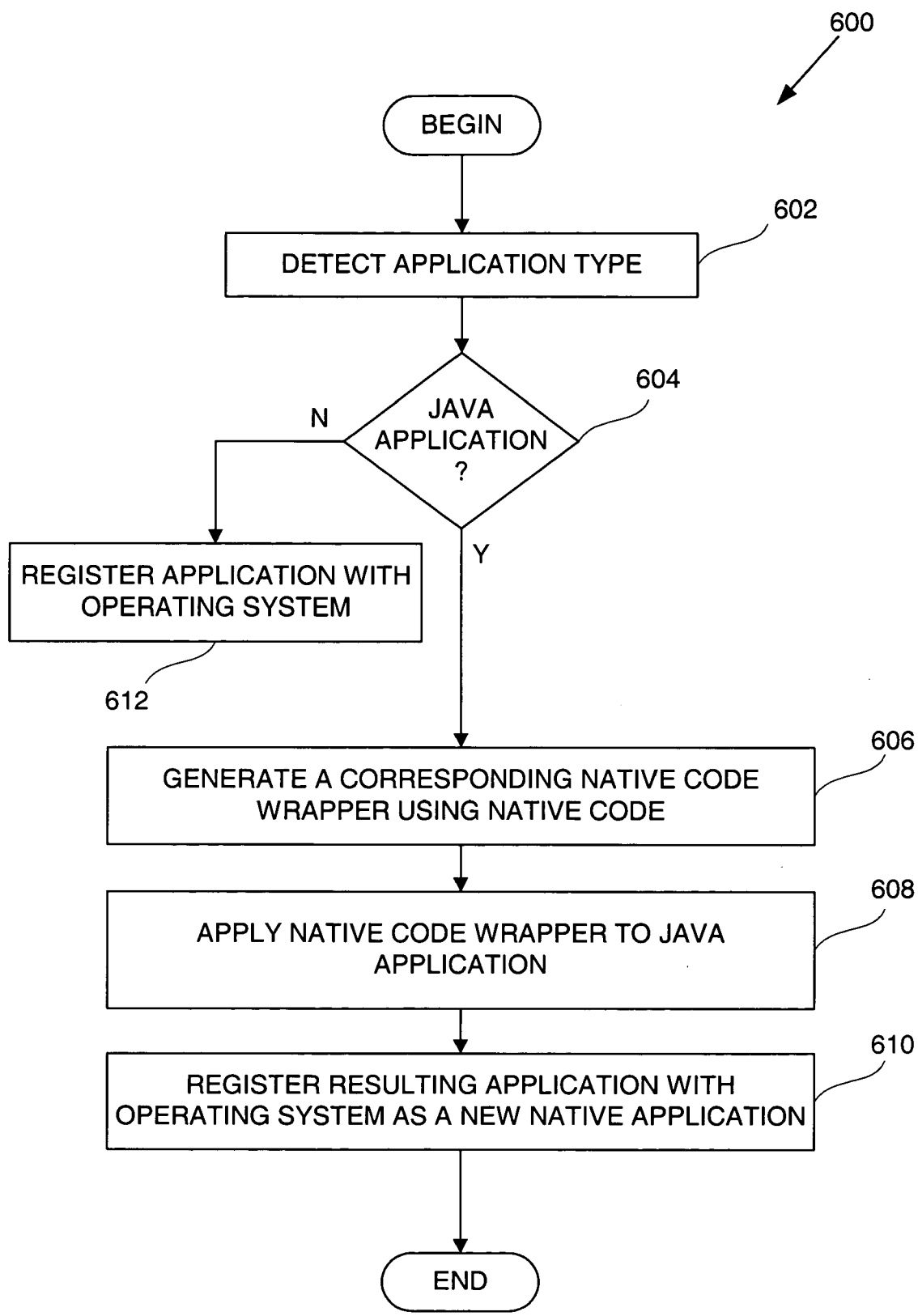
FIG. 6 a flowchart of method operations performed during provisioning of an exemplary Java application on a mobile device, in accordance with yet another embodiment of the present invention.

Proceeding to FIG. 6, a flowchart 600 of method operations performed during provisioning of an exemplary Java application on a mobile device is depicted, in accordance with one embodiment of the present invention. The method begins with operation 602 in which a type of an application is detected. In operation 604, a determination is made as to whether the application is a Java application. If the application type is not Java, the method continues to operation 612, in which the application is registered with the operating system.

If determination is made that the application is a Java application, the method continues to operation 606 in which a corresponding native code wrapper is generated for the Java application. As was explained in more detail above, the native code wrapper is analyzed by the JAM, thus leading to generating the corresponding native code wrapper. Next, in operation 608, the native code wrapper is applied to the Java application. That is, the native code wrapper is used to provide the identical functionalities of the native applications thus hiding the non-native nature of the Java application. Moving to operation 610, the resulting application is registered with the operating system as a new native application. The resulting application is a first class citizen application that can be accessed by the user in the same manner as any of the native applications. As such, as can be appreciated, in one example, provisioning the native code wrapper has two aspects. The first aspect is being able to monitor all incoming applications, whether native or non-native. Second, being able to generate a respective native code wrapper for each non-native application.

Figure 7A:
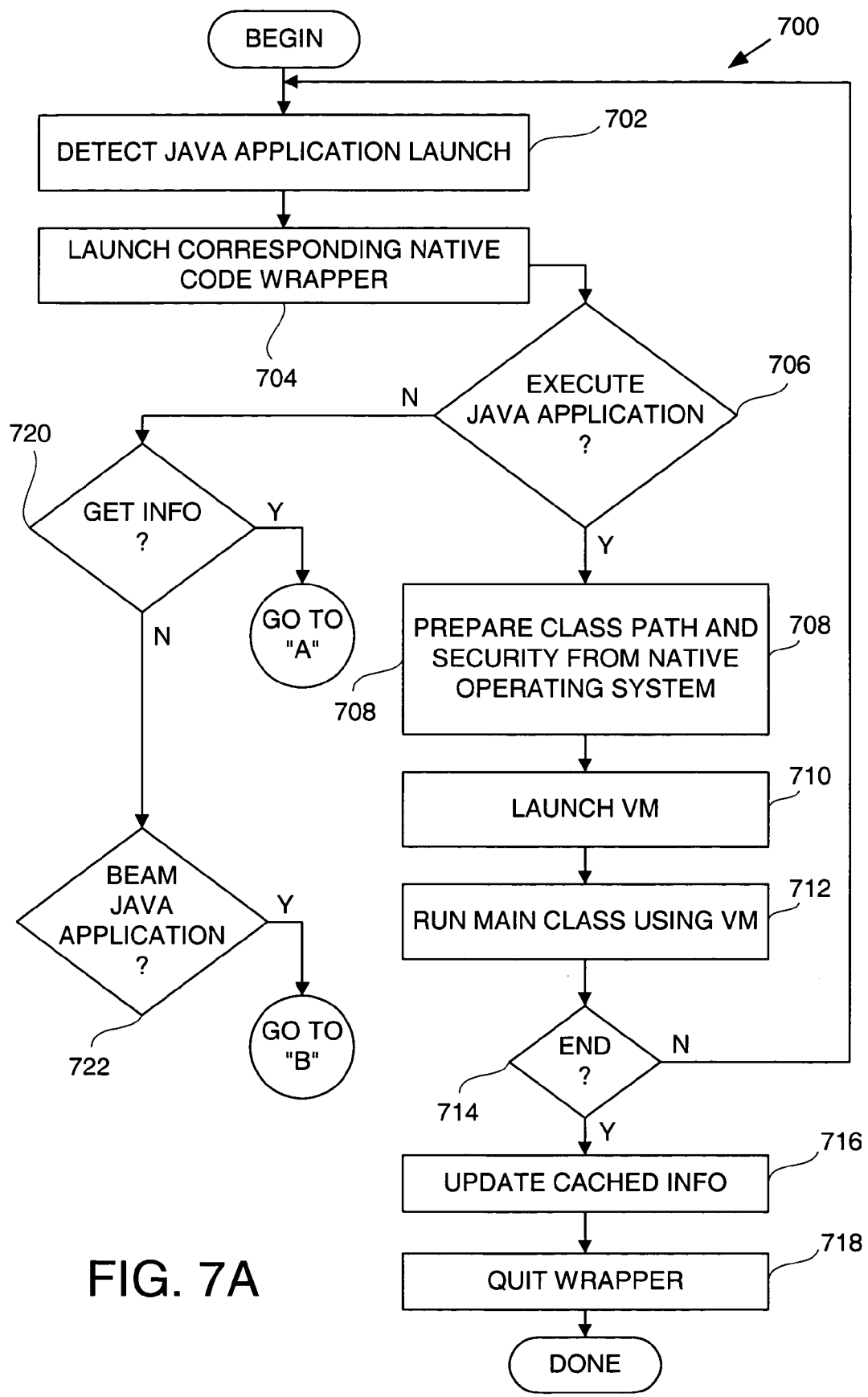
FIG. 7A is a flowchart diagram of method operations performed during three exemplary actions, execution, getting information, and beaming of an installed non-native Java application, in accordance with still another embodiment of the present invention.
Figure 7B:
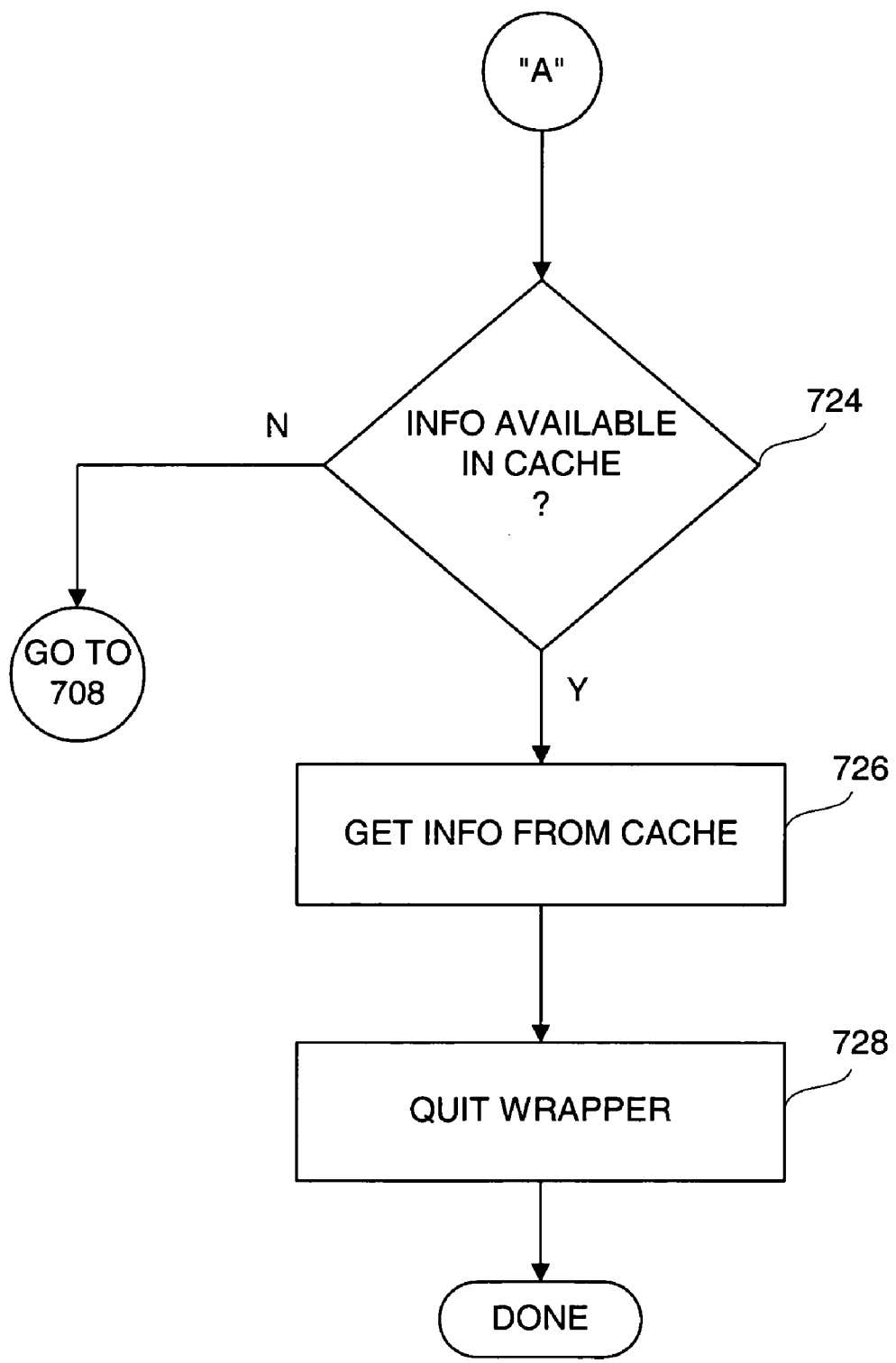
FIG. 7B is a flowchart diagram of method operations performed during in getting information about a non-native application, in accordance with still another embodiment of the present invention.
Figure 7C:
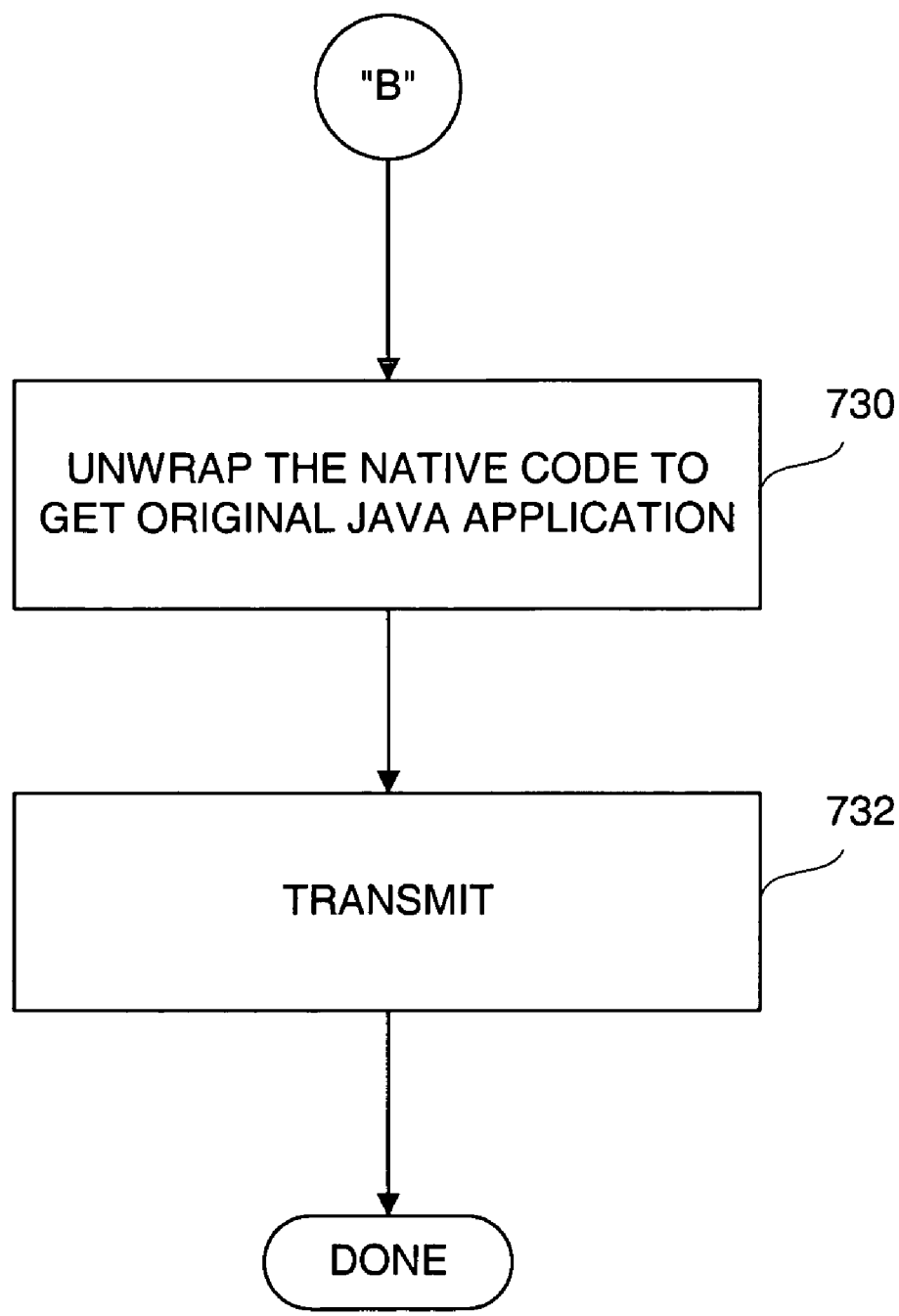
FIG. 7C is a flowchart diagram of method operations performed during beaming of a non-native application, in accordance with still another embodiment of the present invention.

FIGS. 7A–7C depict flowchart 700 of method operations performed during three exemplary actions, execution, getting information, and beaming of an installed non-native Java application, in accordance with one embodiment of the present invention. The method begins with operation 702 in which launching of a Java application is detected following by operation 704 in which the corresponding native code wrapper is launched. Proceeding to operation 706, a determination is made as to whether a selection is made to execute the Java application. If the selection is to execute the Java application in operation 706, the method continues to operation 708. Otherwise, the method continues to operation 720.

To execute the Java application, the class path and security from the native operating system is prepared in operation 708. In one example, the main class marking the starting point of Java application execution is identified. Subsequently, the virtual machine is launched in operation 710. Next, in operation 712, the main class is run using the virtual machine. Thereafter, in operation 714, a decision is made as to whether any more selections have been made. If it is determined that the user has not made any other selections, the method continues to operation 716 in which the cached information is updated. At this point, the native code wrapper quits in operation 718. It must be noted that in operation 718, the operating system assumes that the Java application has also seized. If the user has selected another Java application in operation 714, the method continues to operation 702.

If in operation 706 the user does not wish to execute the Java application, the method continues to operation 720 in which a decision is made as to whether the user has selected to perform a different action such as getting information about the Java application. If the user has selected to get information, the method continues to "A." Otherwise, the method continues to operation 722 in which a decision is made as to whether the user has selected to perform yet another action, beaming the Java application. If the user has selected to beam the Java application, the method continues to "B".

Proceeding to "A" as shown in operation 724 in FIG. 7B, a decision is made as to whether the information selected by the user is available in cache. If the information is available in cache, the method continues to operation 726 in which the information is obtained from the cache. At this point, the native code wrapper quits in operation 728. In one example, the operating system assumes that the first class citizen application also quits. If the information selected is not available in cache, the method continues to operation 708 in which the class path and security from the native operating system is obtained.

In operation 730 shown in FIG. 7C, the native code of the native Java wrapper application is unwrapped so that the original Java application can be obtained. Thereafter, in operation 732, the Java application is transmitted to the device. At the receiving end, the user will follow the provisioning methods set forth in FIG. 6 so as to install the new Java application as a first class citizen application.

FIGS. 8A–8E depict flowchart 800 of method operations performed by a native code wrapper to hide the non-native nature of a non-native Java application, in accordance with one embodiment of the present invention. The method begins in operation 802 in which a native API request is received from a native operating system. As stated in more detail above, the operating system expects that the first class citizen application handle the native API calls as if the first class citizen application is a native application.

Continuing to operation 804, a determination is made as to whether the non-native Java application is capable of handling the API request. If the Java application is capable of handling the native API request, the method continues to operation 806 in which a determination is made as to whether the non-native Java application can handle the format of the API Request. If the format of the API request can be handled, the method next continues to operation 808 in which a determination is made as to whether the non-native Java application structure interface is a Java interface structure. If the Java application interface structure is Java interface structure, the method continues to "E." Otherwise, the method continues to "F."

If in operation 804 a determination is made that the non-native Java application cannot handle the native API call, the method continues to "C." In a like manner, if in operation 806 a determination is made that the non-native Java application cannot handle the format of the API request, the method continues to "D."

Figure 8A:
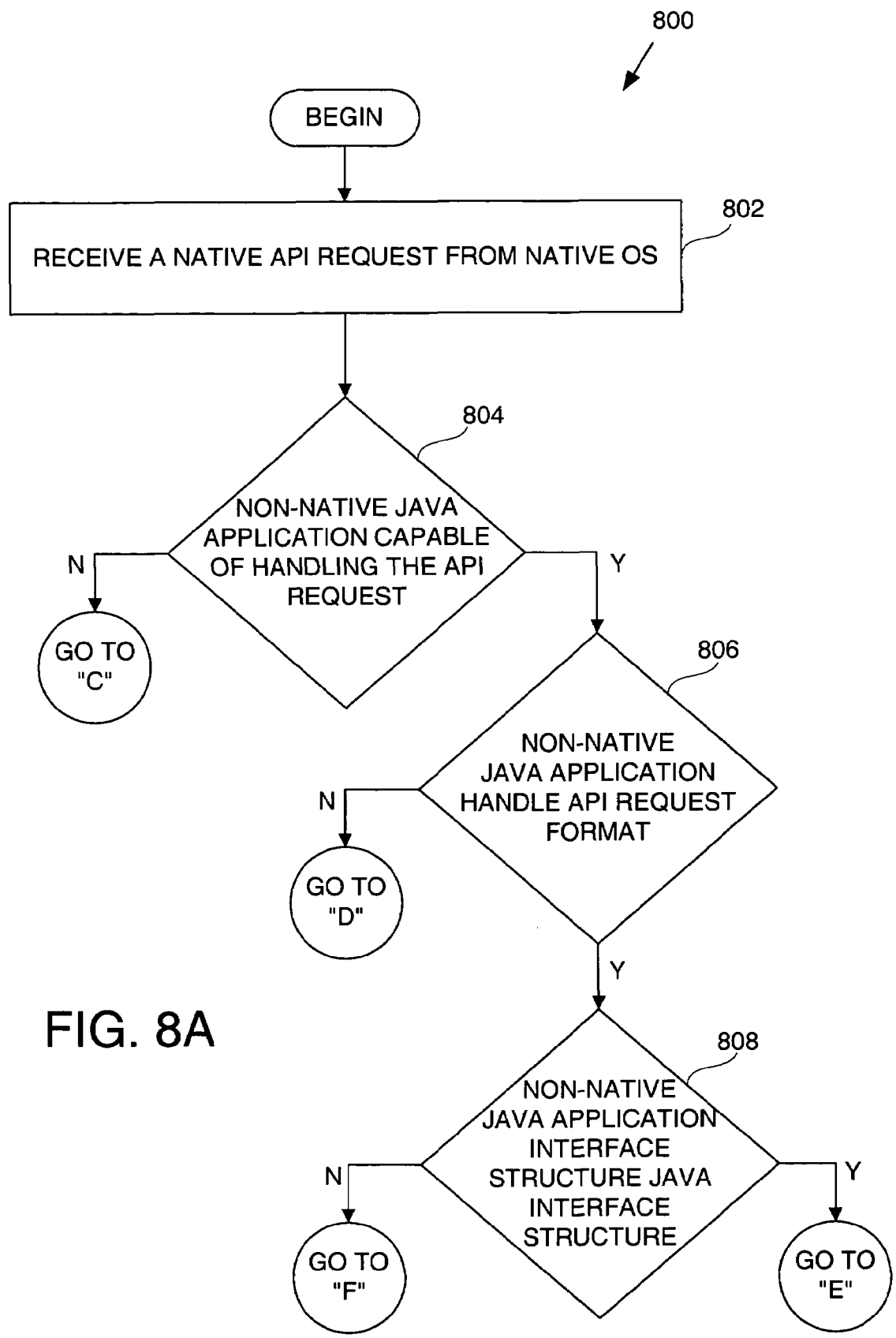
FIG. 8A depicts a flowchart diagram of method operations performed by a native code wrapper to hide the nature of a non-native Java application, in accordance with yet another embodiment of the present invention.
Figure 8B:
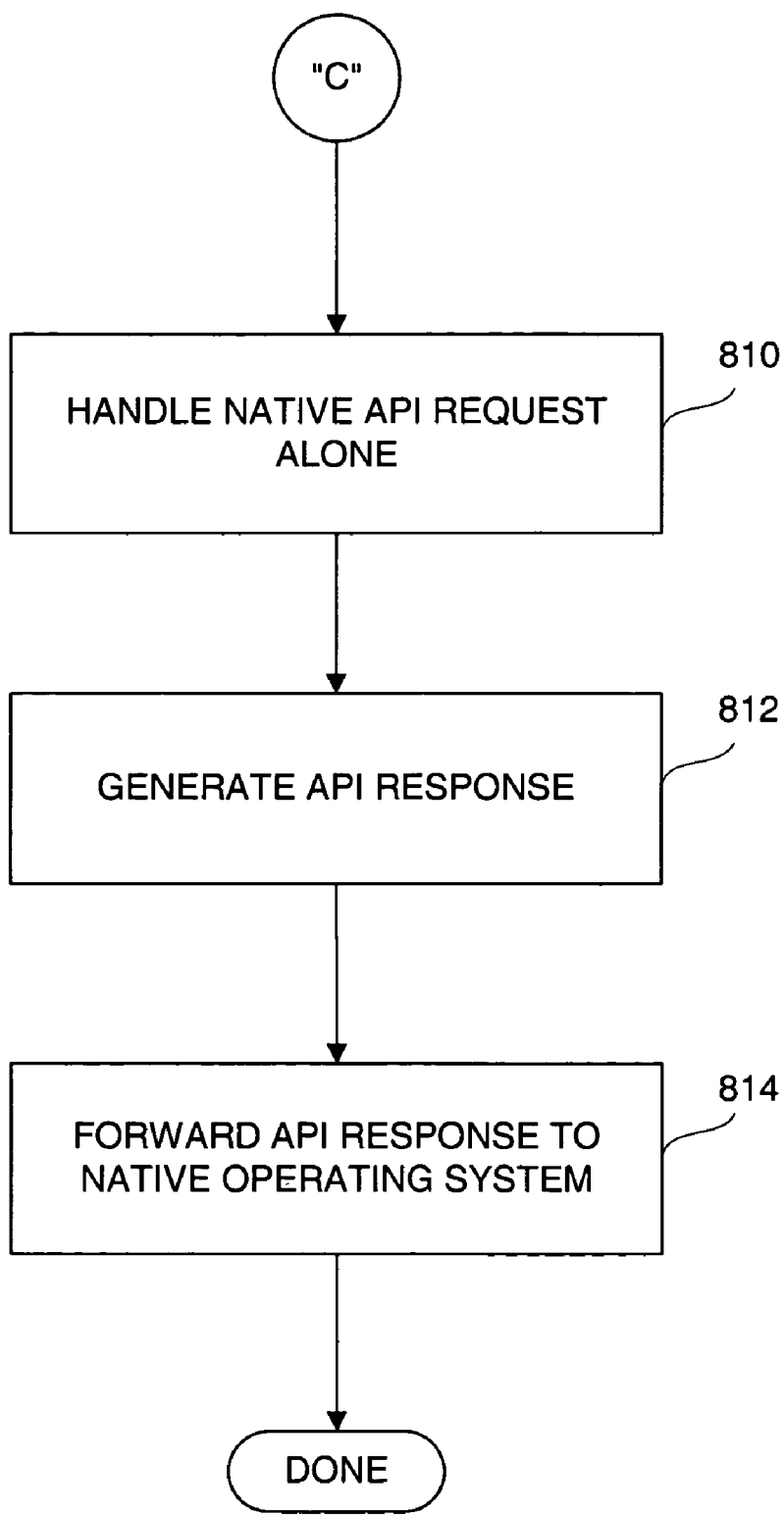
FIG. 8B depicts a flowchart diagram of method operations performed by a native code wrapper to hide the nature of a non-native Java application, in accordance with yet another embodiment of the present invention.

Proceeding to "C" as depicted in FIG. 8B, if the non-native Java application cannot handle the API request, the method continues to operation 810 in which the native code wrapper handles the API request alone. Next, in operation 812, an API response is generated by the native code wrapper proceeding to operation 814 in which the API response is forwarded to the native operating system.

Figure 8C:
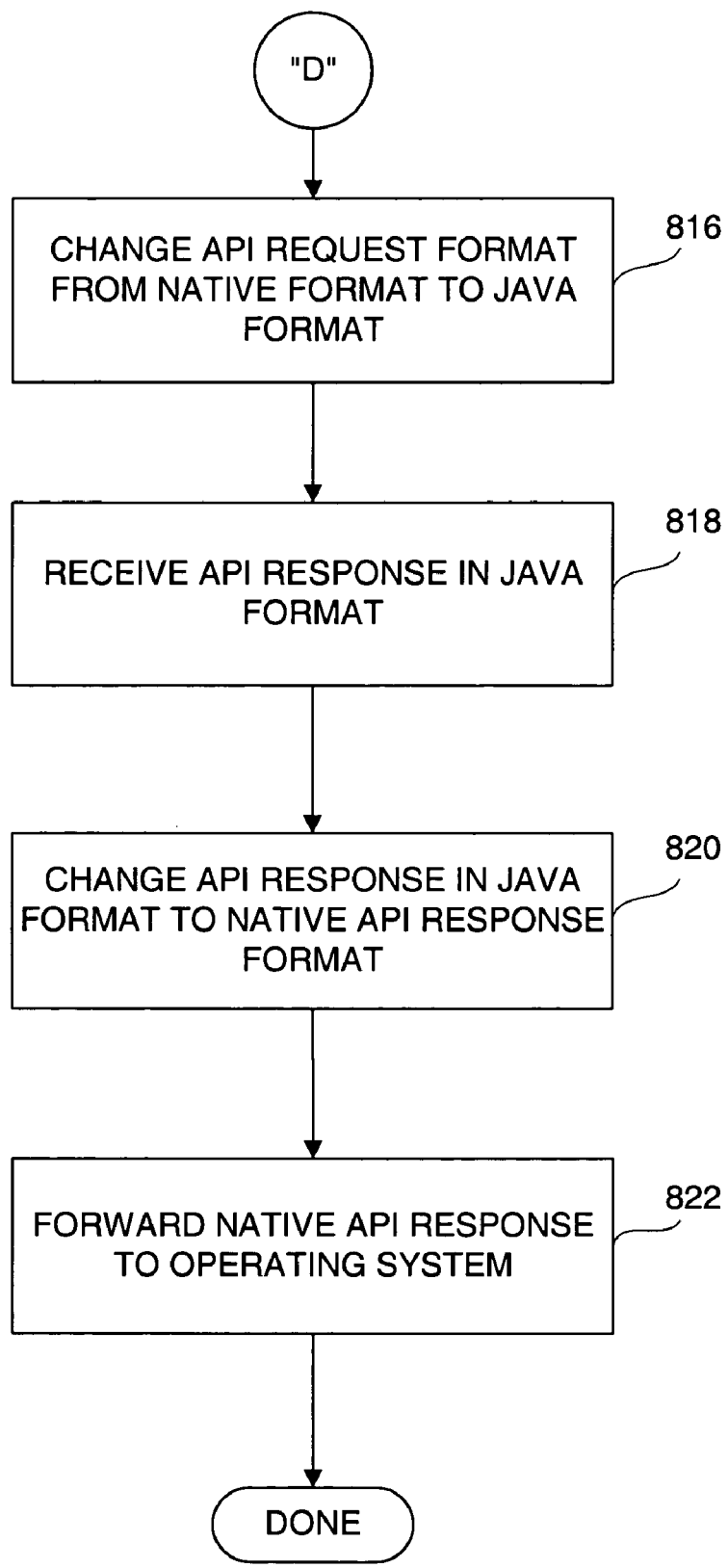
FIG. 8C depicts a flowchart diagram of method operations performed by a native code wrapper to hide the nature of a non-native Java application, in accordance with yet another embodiment of the present invention.

If in operation 806 a determination is made that the non-native Java application cannot handle the format of the API request, the method continues to "D" as set shown in FIG. 8C. In operation 816, the format of the API request is changed from the native format to the Java format by the native code wrapper. Next, in operation 818, an API response is received from the Java application in the Java format followed by operation 820 in which the format of the API response is changed from the Java format to the native format. Then, in operation 822, the API response in the native format is forwarded to the operating system.

Figure 8D:
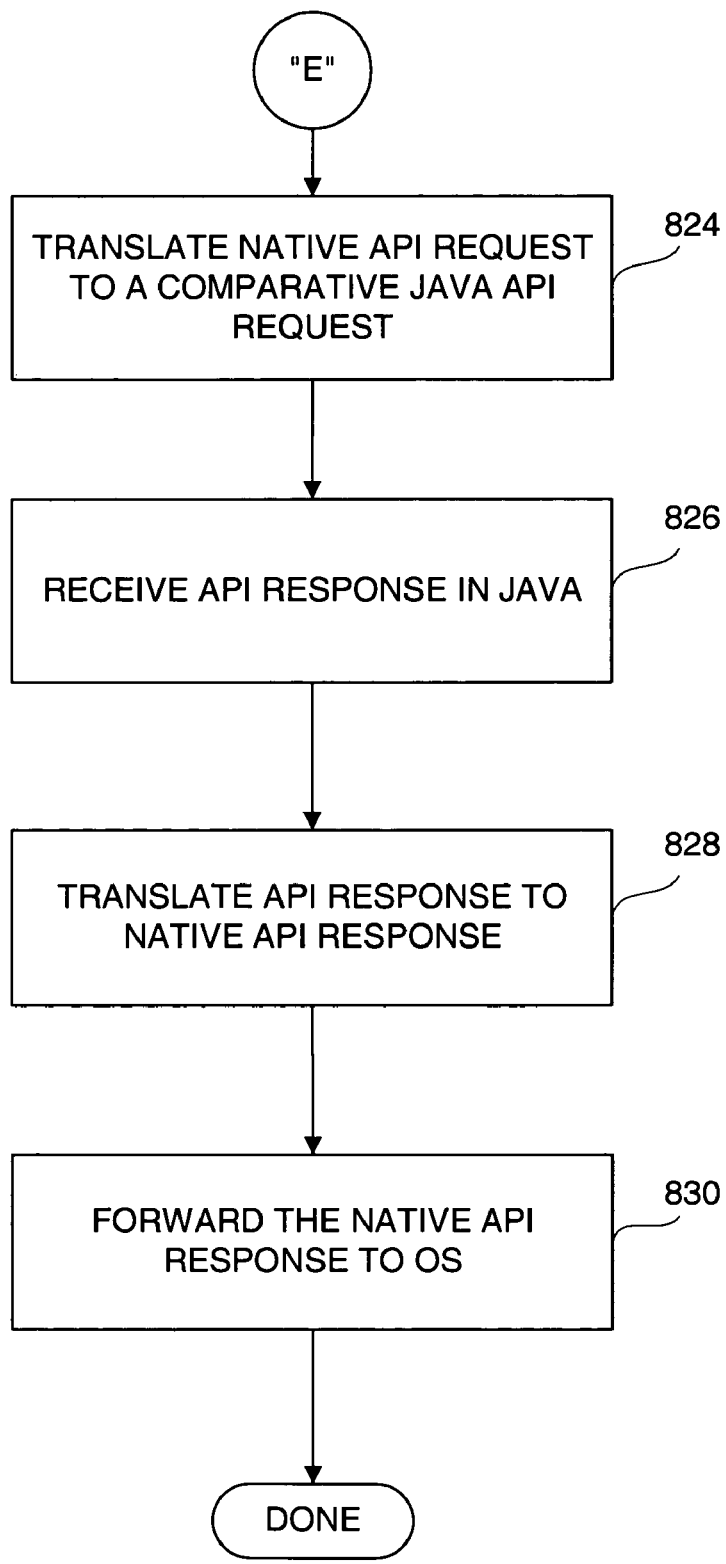
FIG. 8D depicts a flowchart diagram of method operations performed by a native code wrapper to hide the nature of a non-native Java application, in accordance with yet another embodiment of the present invention.

If the format of the API request can be handled by the Java application and the Java application interface structure is Java interface structure, the method continues to operation 824 shown in FIG. 8D, in which the native API request is translated to a comparative Java API request. Next, the method continues to operation 826 in which the API response is received in Java. In one example, depending on the nature of the API request, the VM may be launched so as to access the result. Then, in operation 828, the API response in Java is translated into the native API response followed by operation 830 in which the native API response is forwarded to the operating system.

Figure 8E:
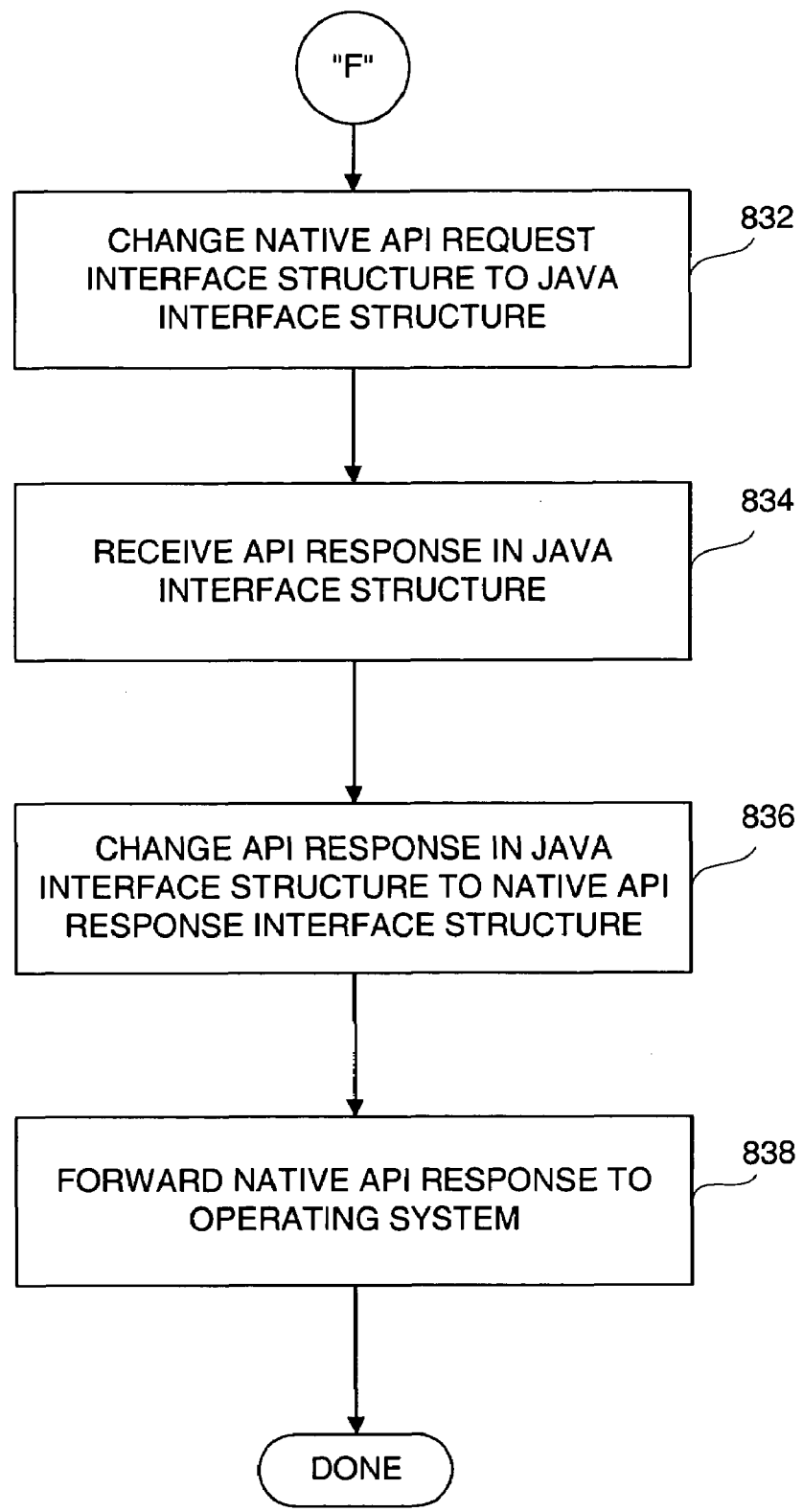
FIG. 8E depicts a flowchart diagram of method operations performed by a native code wrapper to hide the nature of a non-native Java application, in accordance with still another embodiment of the present invention.

If the format of the API request can be handled by the Java application and the Java application interface structure is not Java interface structure, the method continues to operation 832 shown in FIG. 8E in which the native API request interface structure is changed to the Java interface structure. Then, in operation 834, the API response is received in Java interface structure continuing to operation 836 in which the API response interface structure is changed to the native API response interface structure. The method then proceeds to operation 838 in which the native API response is forwarded to the operating system. As can be appreciated, in this manner, the native code wrapper transparently handles each and every native API request.

The advantages of the present invention are numerous. Most importantly, the user can access native or non-native applications in the same manner, as if all the applications are first class citizen applications of the device. Thus, the responsiveness of the non-native applications is substantially comparable to that of native applications. Another advantage of the present invention is that the Java code or the non-native application being camouflaged by being wrapped with the native code wrapper remains intact. In this manner, the non-native application has not been compromised and as such, can be shared by other devices. Yet another advantage of the present invention is that the number of interactions (e.g., clicks) has been reduced, as the user is no longer required to launch the JAM, thus, increasing usability. Lastly, additional functionality can be included in the native code wrapper so as to provide extra features specifically tailored to the native platform.

Although specific reference is made to terminology defined by Sun Microsystems, Inc., it should be understood that any name could be used for such terms, so long as the desired functionality is achieved. For instance, reference is made to JAR and JAD file, but in a broad sense, these terms simply define computer code and data. The same applies to the underlying environment for the device 102. Device 102 can be any mobile device, and the device can run any operating system. The operating system can support any communication protocol, including protocols for downloading application files. Accordingly, any reference to a particular standard should be viewed only as exemplary and focus should be placed on the claimed functional operation.

With the above embodiments in mind, it should be understood that, the invention may be practiced with other computer system configurations including hand-held devices, microprocessor systems, microprocessor-based or programmable consumer electronics, minicomputers, mainframe computers and the like. Furthermore, the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Furthermore, although the present invention implements Java programming language, other programming languages may be used to implement the embodiments of the present invention (e.g., C, $C_{++}$, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for camouflaging a non-native application as a native application of a device, the method comprising:

generating a native code wrapper in a device dependent native code on the device to handle a communication between a native operating system and the non-native application resident on the device, the native code wrapper generated by the device; and applying the native code wrapper to the non-native application generating a wrapped non-native application, the native code wrapper enabling the wrapped non-native application to camouflage as a native application of the device, wherein the non-native application remains intact while in contact with the native code wrapper.

2. A method as recited in claim 1, wherein the native code wrapper enables the non-native application to interact as does the native application.

3. A method as recited in claim 1, wherein the native code wrapper performs one of translating the communication between the operating system and the non-native application, changing format of the communication between the operating system and non-native application, modifying interface structure of the communication between the operating system and non-native application, and directly handling the communication between the operating system and non-native application.

4. A method as recited in claim 1, further including, registering the wrapped non-native application with the native operating system.

5. A method for generating a native code wrapper to hide a non-native nature of a Java application being downloaded to a device, the method comprising:

analyzing the Java application; and generating a device dependent native code on the device to handle a communication between a native operating system and the Java application while keeping the Java application intact, the native code wrapper generated by the device enabling hiding of the non-native nature of the Java application.

6. A method as recited in claim 5, wherein the native code wrapper directly handles the communication between the native operating system and the Java application.

7. A method as recited in claim 5, wherein the native code wrapper handles the communication between the native operating system and the Java application by translating a native communication generated by the native operating system to a Java application communication.

8. A method as recited in claim 7, wherein the native code wrapper further translates a Java application response generated by the Java application to a native response expected by the native operating system.

9. A method for accessing a native application and a non-native application identically, the method comprising:

downloading an application on to a device;

detecting a type of the application;

if the type of the application is native, registering the application with a native operating system of the device; and if the type of the application is not native, generating a native code wrapper for the non-native application in a device dependent native code on the device;

applying the native code wrapper to the non-native application so as to generate a wrapped non-native application, the applying configured to keep the application intact; and registering the wrapped non-native application with the operating system as a new native application, wherein the native code wrapper camouflages the application having a non-native type as a native application, the registering of the wrapped non-native application with the operating system enabling access to wrapped non-native applications by the operating system.

10. A method as recited in claim 9, wherein the native code wrapper is in device dependent native code.

11. A method as recited in claim 9, wherein the application is a non-native Java application.

12. A method as recited in claim 11, wherein the operation of generating a native code wrapper for the application includes, analyzing the application to generate a device dependent native code capable of providing functionality as provided by the native application while interacting with the native operating system.

13. A method as recited in claim 12, wherein the native code wrapper is configured to provide a launch functionality, a share functionality, a get info functionality, a remove functionality, an update functionality, and a create shortcut functionality.

14. A method as recited in claim 12, wherein the operation of analyzing the application is performed by a Java Application manager ("JAM").

15. A method as recited in claim 11, wherein the native code wrapper is configured to handle an application program interface (API request generated by the native operating system to the non-native application in a same manner as does the native application.

16. A computer program embodied on a computer readable medium for causing a computer system to perform a method for camouflaging a non-native application as a native application of a device, the method comprising:

generating a native code wrapper in a device dependent native code on the device to handle communication between a native operating system and the non-native application resident on the device, the native code wrapper generated by the device; and applying the native code wrapper to the non-native application generating a wrapped non-native application, the native code wrapper enabling the wrapped non-native application to camouflage as a native application of the device, wherein the non-native application remains intact while in communication with the native code wrapper.

17. The computer program embodied on a computer readable medium as recited in claim 16, wherein the native code wrapper enables the non-native application to interact as does a native application.

18. The computer program embodied on a computer readable medium as recited in claim 16, wherein the native code wrapper performs one of translating a communication between the non-native application and the operating system, changes format of the communication between the operating system and non-native application, changes interface structure of the communication between the operating system and non-native application, and handles the communication issued by the operating system to the non-native application.

* * * * *